US012321127B2

(12) United States Patent
Koga et al.

(10) Patent No.: US 12,321,127 B2
(45) Date of Patent: Jun. 3, 2025

(54) IMAGE FORMING APPARATUS

(71) Applicant: CANON KABUSHIKI KAISHA, Tokyo (JP)

(72) Inventors: Satoshi Koga, Shizuoka (JP); Naoki Maeda, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/212,241

(22) Filed: Jun. 21, 2023

(65) Prior Publication Data

US 2023/0418216 A1 Dec. 28, 2023

(30) Foreign Application Priority Data

Jun. 24, 2022 (JP) ................................ 2022-102265

(51) Int. Cl.
*G03G 21/18* (2006.01)
*G03G 15/08* (2006.01)

(52) U.S. Cl.
CPC ..... *G03G 21/1814* (2013.01); *G03G 15/0875* (2013.01); *G03G 15/0889* (2013.01); *G03G 2215/068* (2013.01)

(58) Field of Classification Search
CPC ........... G03G 21/1647; G03G 21/1676; G03G 21/1825; G03G 21/185
See application file for complete search history.

(56) References Cited

U.S. PATENT DOCUMENTS 10,248,077 B2 * 4/2019 Numata ............... G03G 21/181
2013/0170868 A1 * 7/2013 Acosta ............... G03G 15/0886 399/258
2015/0362869 A1 12/2015 Maeda et al.
2017/0108827 A1 * 4/2017 Kusano .............. G03G 21/1853
2020/0209803 A1 * 7/2020 Kimura .............. G03G 21/1896
2020/0401080 A1 12/2020 Maeda et al.
2021/0080868 A1 * 3/2021 Yamada ............. G03G 15/0867

FOREIGN PATENT DOCUMENTS

JP 2007-219269 A 8/2007
JP 2020-042309 A 3/2020

OTHER PUBLICATIONS

Co-pending U.S. Appl. No. 18/207,190, filed Jun. 8, 2023.
Co-pending U.S. Appl. No. 18/208,405, filed Jun. 12, 2023.
Co-pending U.S. Appl. No. 18/210,152, filed Jun. 15, 2023.
Co-pending U.S. Appl. No. 18/213,383, filed Jun. 23, 2023.

* cited by examiner

*Primary Examiner* — Jessica L Eley
(74) *Attorney, Agent, or Firm* — Venable LLP

(57) ABSTRACT

An image forming apparatus includes an apparatus body including a first positioning portion, a first cartridge including a developer bearing member, and a second positioning portion, the first cartridge being attachable to and detachable from the apparatus body, and a second cartridge including a storage portion configured to accommodate the developer, a first positioned portion, and a second positioned portion. The second cartridge is configured to be attached to and detached from the apparatus body in a state where the first cartridge is attached to the apparatus body, and a position of the second cartridge in the attachment direction and an orthogonal direction orthogonal to the attachment direction with respect to the apparatus body and the first cartridge is determined by the first positioning portion and the second positioning portion coming into contact with the first positioned portion and the second positioned portion, respectively.

16 Claims, 18 Drawing Sheets

IMAGE FORMING APPARATUS

BACKGROUND OF THE INVENTION

Field of the Invention

The present invention relates to an image forming apparatus that forms an image on a sheet.

Description of the Related Art

JP 2020-042309 A and JP 2007-219269 A propose image forming apparatuses each including a process cartridge configured to be attachable to and detachable from an apparatus body and a toner cartridge. The toner cartridge does not include a photosensitive drum and or a process member that acts on the photosensitive drum, and is configured to be able to supply a toner to the process cartridge.

The toner cartridge described in JP 2020-042309 A is held such that it is attachable to and detachable from the process cartridge attached to the apparatus body. However, it is necessary for the process cartridge to have a shape for holding the toner cartridge, and it is necessary to firmly configure the process cartridge to support the weight of the toner cartridge. This leads to an increase in size of the process cartridge.

Also, the toner cartridge described in JP 2007-219269 is held such that it is attachable to and detachable from the apparatus body rather than the process cartridge. However, since the process cartridge and the toner cartridge are separately attached to the apparatus body, there is a problem in accuracy of positioning the toner cartridge with respect to the process cartridge.

SUMMARY OF THE INVENTION

According to a first aspect of the present invention, an image forming apparatus includes an apparatus body including a first positioning portion, a first cartridge including a developer bearing member configured to bear a developer, and a second positioning portion, the first cartridge being attachable to and detachable from the apparatus body, and a second cartridge including a storage portion configured to accommodate the developer, a first positioned portion, and a second positioned portion, the second cartridge being attachable to and detachable from the apparatus body in an attachment direction. The second cartridge is configured to be attached to and detached from the apparatus body in a state where the first cartridge is attached to the apparatus body, and a position of the second cartridge in the attachment direction and an orthogonal direction orthogonal to the attachment direction with respect to the apparatus body and the first cartridge is determined by the first positioning portion and the second positioning portion coming into contact with the first positioned portion and the second positioned portion, respectively.

According to a second aspect of the present invention, an image forming apparatus includes an apparatus body including a first positioning portion, a first cartridge including a developer bearing member configured to bear a developer, and a second positioning portion, the first cartridge being attachable to and detachable from the apparatus body, and a second cartridge including a storage portion configured to accommodate the developer, a first positioned portion, and a second positioned portion, the second cartridge being attachable to and detachable from the apparatus body in an attachment direction. The second cartridge is configured to be attached to and detached from the apparatus body in a state where the first cartridge is attached to the apparatus body, and a position of the second cartridge on a virtual plane orthogonal to the attachment direction with respect to the apparatus body and the first cartridge is determined by the first positioning portion and the second positioning portion coming into contact with the first positioned portion and the second positioned portion, respectively.

Further features of the present invention will become apparent from the following description of exemplary embodiments with reference to the attached drawings.

DESCRIPTION OF THE EMBODIMENTS

In the following description, an "image forming apparatus" is an apparatus for forming an image on a recording material (recording medium) by using a toner that serves as a developer, examples of which include a single-function printer, a copier, and a multifunction machine. Examples of a sheet used as the recording medium include paper such as ordinary paper and thick paper, a plastic film such as a sheet for an overhead projector, a special form sheet such as an envelope or index paper, and a cloth.

First Embodiment

Overall Configuration

Figure 1:
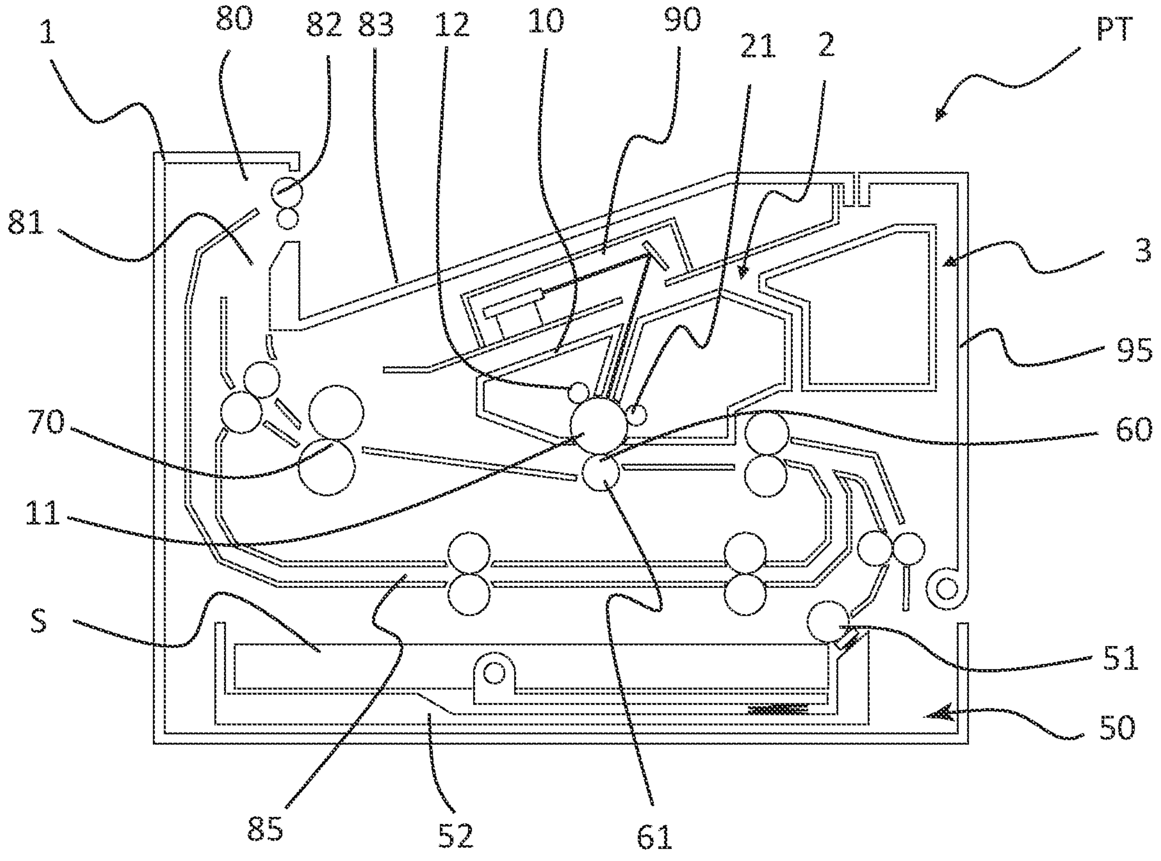
FIG. 1 is an overall schematic view illustrating a printer according to a first embodiment.

FIG. 1 is a schematic diagram illustrating a sectional configuration of a monochrome laser beam printer (hereinafter referred to as a printer PT) that serves as an image forming apparatus according to a first embodiment. However, dimensions, materials, shapes, relative dispositions thereof, and the like of components described in the following embodiments should be appropriately changed depending on a configuration of the apparatus to which the present technology is applied and various conditions. Therefore, the scope of the present technology is not particularly limited thereto unless otherwise specifically indicated. The printer PT is configured of a printer body 1, a process cartridge 2 that serves as a first cartridge, and a toner cartridge 3 that serves as a second cartridge.

The printer body 1 includes a sheet feeding portion 50, a transfer roller 61, a fixing unit 70, and a laser scanner 90. The process cartridge 2 is provided such that it is attachable to and detachable from the printer body 1. The process cartridge is configured to be able to be attached to and detached from the image forming apparatus body by forming an image bearing member and a process unit acting on the image bearing member as a cartridge. The toner cartridge 3 accommodates a toner that serves as a developer and is configured to be able to be attached to and detached from the image forming apparatus body. The printer body 1 that serves as the apparatus body can be said to be a part of the printer PT excluding the process cartridge 2 and the toner cartridge 3.

Figure 2A:
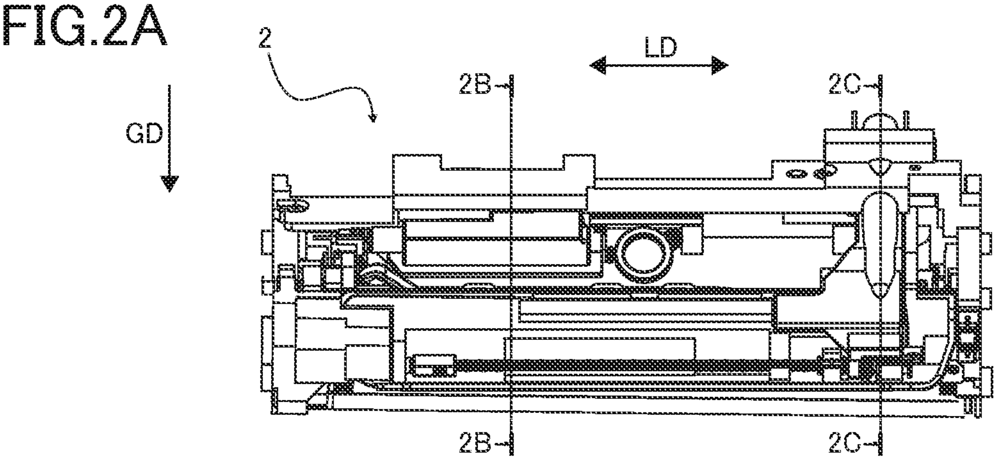
FIG. 2A is a front view illustrating a process cartridge.
Figure 2B:
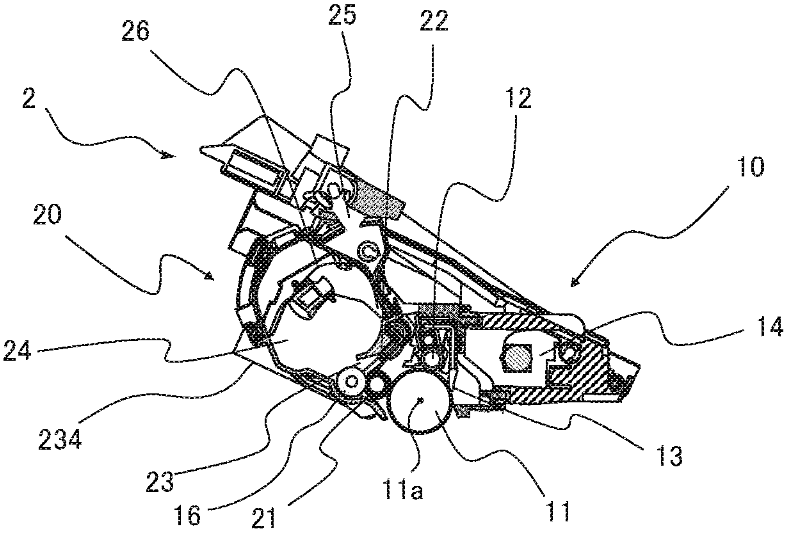
FIG. 2B is a sectional view illustrating a section along 2B-2B in FIG. 2A.
Figure 2C:
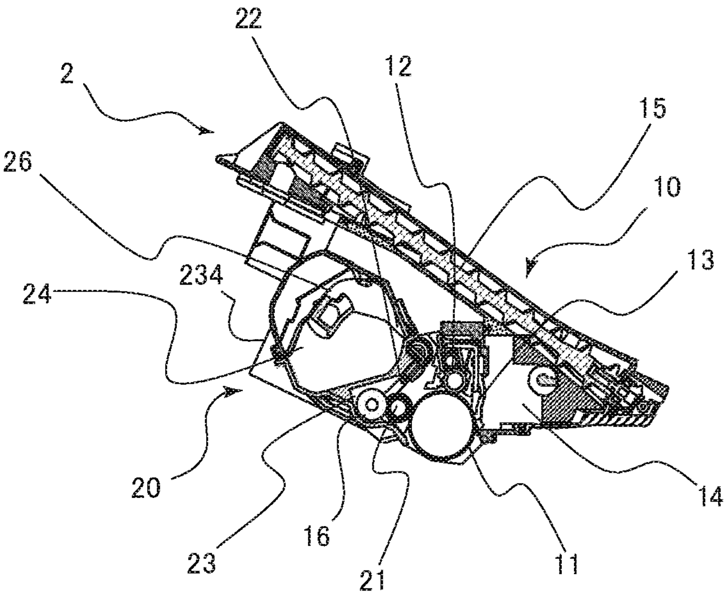
FIG. 2C is a sectional view illustrating a section along 2C-2C in FIG. 2A.

The process cartridge 2 will be described using FIGS. 1 and 2A to 2C. FIG. 2A is a front view of the process cartridge 2 (a view of the process cartridge 2 from the left in FIG. 1). FIG. 2B is a sectional view illustrating a section along 2B-2B in FIG. 2A, and FIG. 2C is a sectional view illustrating a section along 2C-2C in FIG. 2A. Note that the left-right direction, the up-down direction, and the front-back direction of the process cartridge 2 from the viewpoint in FIG. 2A may be referred to below unless particularly indicated otherwise. In other words, a first end side of the process cartridge 2 in the longitudinal direction LD may be referred to as a left side, and a second end side may be referred to as a right side.

Hereinafter, the direction of gravity (downward with respect to gravity) in a state where the process cartridge 2 and the toner cartridge 3 are attached to the printer body 1 and the printer body 1 is installed in a horizontal plane is defined as a gravity direction GD. Also, the longitudinal direction (the axis direction of the photosensitive drum 11) of the process cartridge 2 is defined as the longitudinal direction LD. Note that the left-right direction, the up-down direction, and the front-back direction of the toner cartridge 3 from the viewpoint in FIG. 3 may be referred to below unless particularly indicated otherwise. In other words, a first end side of the toner cartridge 3 in the longitudinal direction LD may be referred to as a left side, and a second end side may be referred to as a right side. In addition, element dispositions, shapes, and the like of the process cartridge 2 and the toner cartridge 3 will be described on the basis of a state where the process cartridge 2 and the toner cartridge 3 are attached to the printer body 1.

As illustrated in FIGS. 1 and 2A to 2C, the process cartridge 2 is configured of a cleaning unit 10 that serves as a first unit and a developing unit 20 that serves as a second unit. The cleaning unit 10 includes a photosensitive drum 11 that serves as a developer bearing member configured to be rotatable about a rotational axis 1*a*. The developing unit 20 includes a developer storage chamber 24 that accommodates a toner that serves as a developer and a developing roller 21 that serves as a developing member bearing the developer.

The cleaning unit 10 includes a photosensitive drum 11, a cleaning blade 13 that serves as a cleaning member for the photosensitive drum 11, a charging roller 12 that serves as a charging member, a waste toner primary storage portion 14, and a waste toner conveyance path 15. The photosensitive drum 11 is obtained by forming a photosensitive layer on the outer circumferential side of a base formed into a columnar shape (drum shape) with an organic photosensitive member or the like. The charging roller 12 is disposed to come into contact with the outer circumferential surface of the photosensitive drum 11. The charging roller 12 charges the photosensitive drum 11 by application of a voltage from a high-voltage substrate provided in the printer body 1. Also, the charging roller 12 is driven by the photosensitive drum 11 and is rotated.

The cleaning blade 13 is a member with elasticity disposed to come into contact with the outer circumferential surface of the photosensitive drum 11. The cleaning blade 13 removes waste toner remaining on the photosensitive drum 11 from the photosensitive drum 11 by the distal end thereof elastically coming into contact with the photosensitive drum 11. The waste toner removed by the cleaning blade 13 is transported to the toner cartridge 3 from the waste toner primary storage portion 14 through the waste toner conveyance path 15.

The developing unit 20 includes a developing chamber 23 where the developing roller 21 is disposed, a developer storage chamber 24 that supplies toner to the developing chamber 23, a receiving port 25 that receives the toner supplied from the toner cartridge 3, a developing blade 22, and a stirring member 26. The developing chamber 23 and the developer storage chamber 24 are spaces formed inside a developing frame 234.

The developing roller 21 supplies the toner to a developing area (an area of the photosensitive drum 11 facing the developing roller 21) of the photosensitive drum 1. The developing roller 21 develops an electrostatic latent image formed on the photosensitive drum 11 by using the toner in the developing area. The developing blade 22 comes into contact with the circumferential surface of the developing roller 21 and restricts the amount (layer thickness) of the toner adhering to the circumferential surface of the developing roller 21. Also, the developing blade 22 frictionally charges the toner adhering to the circumferential surface of the developing roller 21 by rubbing the toner and thereby applies a charge to toner particles.

The stirring member 26 is disposed inside the developer storage chamber 24. The toner accommodated in the developer storage chamber 24 is sent to the developing chamber 23 while being stirred by rotation of the stirring member 26 and is then supplied to the developing roller 21. The stirring member 26 includes a shaft portion extending in a longitudinal direction LD and a sheet-shaped stirring portion with flexibility projecting from the shaft portion in a radial direction. Note that it is possible to dispose the supply roller 16 that supplies the toner in the developing chamber 23 to the developing roller 21 in the developing chamber 23.

The amount of toner in the developer storage chamber 24 is detected by a remaining amount detection portion, which is not illustrated. A control portion of the printer body 1 executes an operation of supplying the toner from the toner cartridge 3 to the process cartridge 2 in a case where the amount of toner in the developer storage chamber 24 decreases below a specific amount, on the basis of a detection signal of the remaining amount detection portion.

Figure 3:
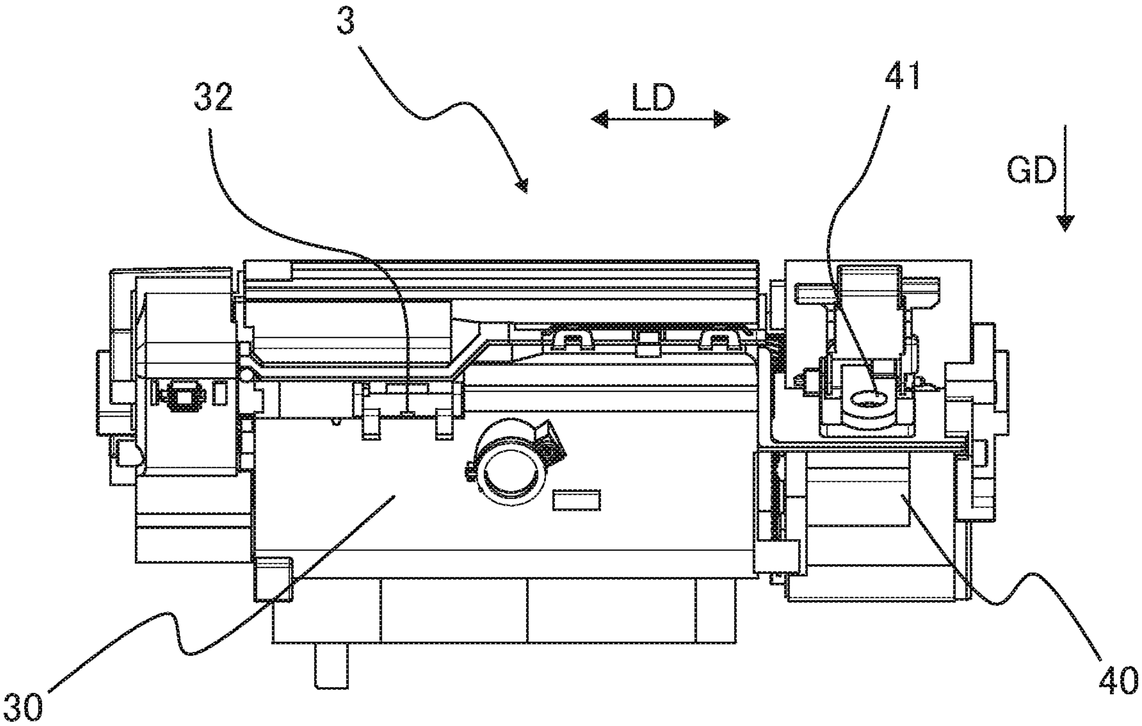
FIG. 3 is a front view illustrating a toner cartridge.

FIG. 3 is a front view illustrating the toner cartridge 3. The toner cartridge 3 includes a toner supply portion 30 that supplies the toner to the process cartridge 2 and a waste toner collecting portion 40 that collects waste toner from the process cartridge 2 as illustrated in FIG. 3.

Next, operations of the printer PT will be described using FIG. 1. The printer PT starts an image forming operation in a case where it receives image information from an external device, for example. Once the image forming operation is started, the photosensitive drum 11 is driven and rotated by a drive source of the printer body 1, and the surface of the photosensitive drum 11 is uniformly charged to a predetermined potential by the charging roller 12. Next, the laser scanner 90 exposes the surface of the charged photosensitive drum 11 on the basis of the image information. In this manner, the charge at the exposed part is removed, and an electrostatic latent image is formed on the surface of the photosensitive drum 11. The electrostatic latent image is developed into a toner image by the toner being supplied from the developing roller 21 to the electrostatic latent image. The toner image born by the photosensitive drum 11 is transported to a transfer portion 60 that is a nip portion between the photosensitive drum 11 and the transfer roller 61.

On the other hand, the sheet feeding portion 50 transports sheets S one by one in parallel with creation of such a toner image. Specifically, the feed roller 51 rotates and feeds the sheets S placed in a feeding cassette 52 one by one. Thereafter, each sheet S is transported to the transfer portion 60 at a timing when the toner image reaches the transfer portion 60. Then, the transfer roller 61 to which a transfer voltage is applied from a high-voltage substrate transfers the toner image from the photosensitive drum 11 to the sheet S when the sheet S passes through the transfer portion 60. Note that the toner (waste toner) remaining on the surface of the photosensitive drum 11 without being transferred from the photosensitive drum 11 to the sheet S by the transfer portion 60 is removed from the surface of the photosensitive drum 11 by the cleaning blade 13.

The sheet S onto which the toner image has been transferred is transported to the fixing unit 70. The fixing unit 70 is on the basis of a thermal fixing scheme and heats and pressurizes the toner image on the sheet S while nipping and transporting the sheet S between nip portions that form a rotary member pair. In this manner, an image fixed on the sheet S is obtained. In a case of one-sided printing, the sheet S that has passed through the fixing unit 70 is transported to a discharge path 81 and is then discharged to the outside of the printer body 1 by a sheet discharge roller pair 82. The sheet S that has been discharged is placed on a sheet discharge tray 83 provided on the upper surface of the printer body 1.

In a case where double-sided printing of forming images on both surfaces of the sheet S is performed, the sheet S with an image formed on the first surface thereof by passing through the transfer portion 60 and the fixing unit 70 is reversed by the sheet discharge roller pair 82 and is then transported to the transfer portion 60 again via a re-conveyance path 85. Then, the sheet S with an image formed on the second surface by passing through the transfer portion 60 and the fixing unit 70 is discharged to the sheet discharge tray 83 by the sheet discharge roller pair 82.

Configuration of Process Cartridge

Figure 4A:
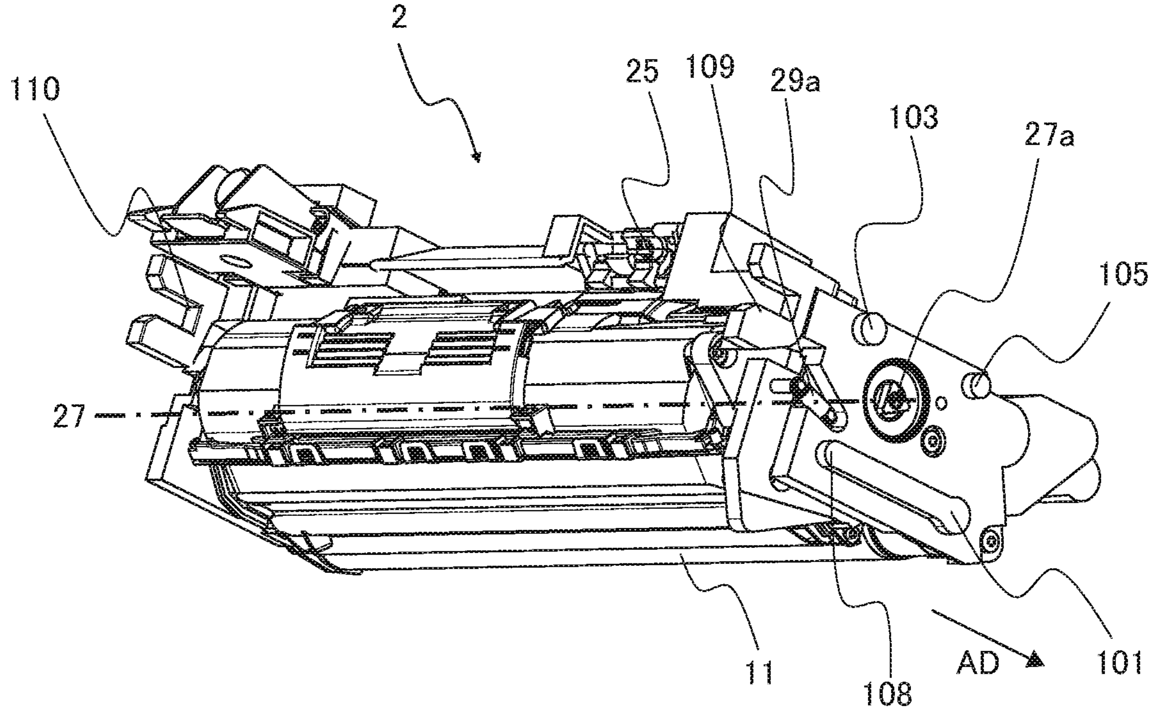
FIG. 4A is a perspective view illustrating a printer body.
Figure 4B:
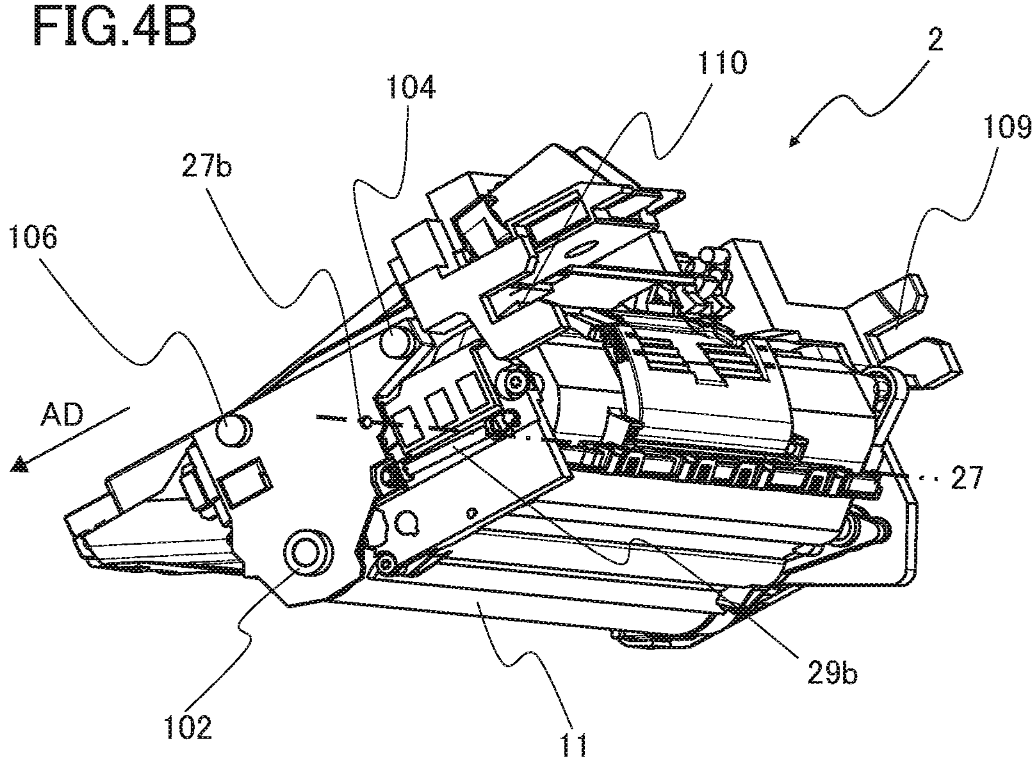
FIG. 4B is another perspective view illustrating the printer body.

Next, a configuration of the process cartridge 2 will be described in detail using FIGS. 2A to 2C, 4A, and 4B. FIG. 4A is a perspective view of the printer body 1 from the lower right, and FIG. 4B is a perspective view of the printer body 1 from the lower left. Note that the attachment direction AD indicated by the arrows in FIGS. 4A and 4B is a direction in which the process cartridge 2 and the toner cartridge 3 are attached to the printer body 1.

As described above, the cleaning unit 10 includes the photosensitive drum 11, the charging roller 12, and the cleaning blade 13 as illustrated in FIGS. 2A to 2C, 4A, and 4B. Additionally, the developing unit 20 includes a developing roller 21, a developing blade 22, a developing chamber 23, a developer storage chamber 24, and a receiving port 25.

The developing unit 20 is coupled to the cleaning unit 10 such that it can pivot about the rotational axis 27 that is a straight line connecting support points 27*a* and 27*b*. The developing unit 20 is biased in a direction in which the developing roller 21 comes into contact with the photosensitive drum 11 around the rotational axis 27 by pressurizing springs 29*a* and 29*b* that are elastic members.

The process cartridge 2 includes positioning bosses 101 and 102 projecting in the left-right direction coaxially with the photosensitive drum 11. Also, the process cartridge 2 includes rotation stopper bosses 103 and 104 and guide bosses 105 and 106 projecting in the left-right direction above the positioning bosses 101 and 102. The rotation stopper bosses 103 and 104 are disposed upstream of the guide bosses 105 and 106 in the attachment direction AD. Moreover, a pressed portion 108 is provided on the right side of the process cartridge 2, and a pressed portion 108 is formed to be continuous with the positioning boss 101.

Further, the process cartridge 2 includes U-shaped toner cartridge positioning portions 109 and 110 on the back side in the attachment direction. In this manner, the positioning boss 101, the rotation stopper boss 103, the guide boss 105, the pressed portion 108, and the toner cartridge positioning portion 109 are provided on the right side of the process cartridge 2. The positioning boss 102, the rotation stopper boss 104, the guide boss 106, and the toner cartridge positioning portion 110 are provided on the left side of the process cartridge 2.

Configuration of Toner Cartridge

Figure 5A:
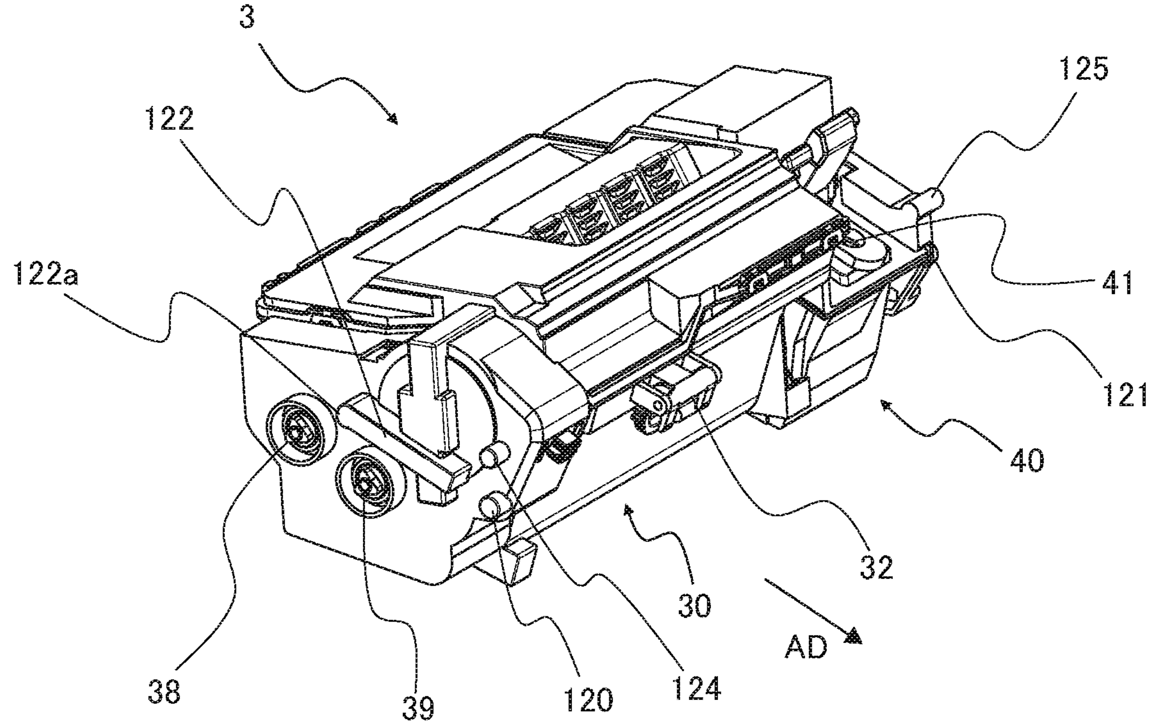
FIG. 5A is a perspective view illustrating the toner cartridge.
Figure 5B:
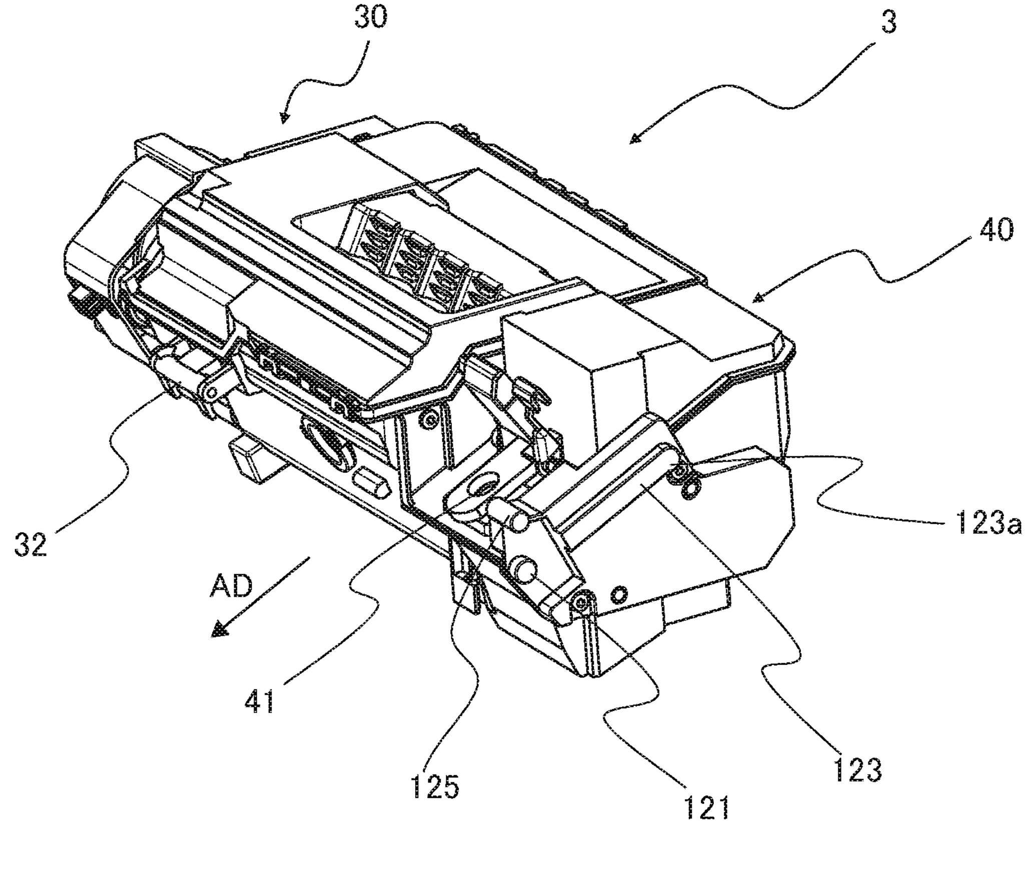
FIG. 5B is another perspective view illustrating the toner cartridge.
Figure 6:
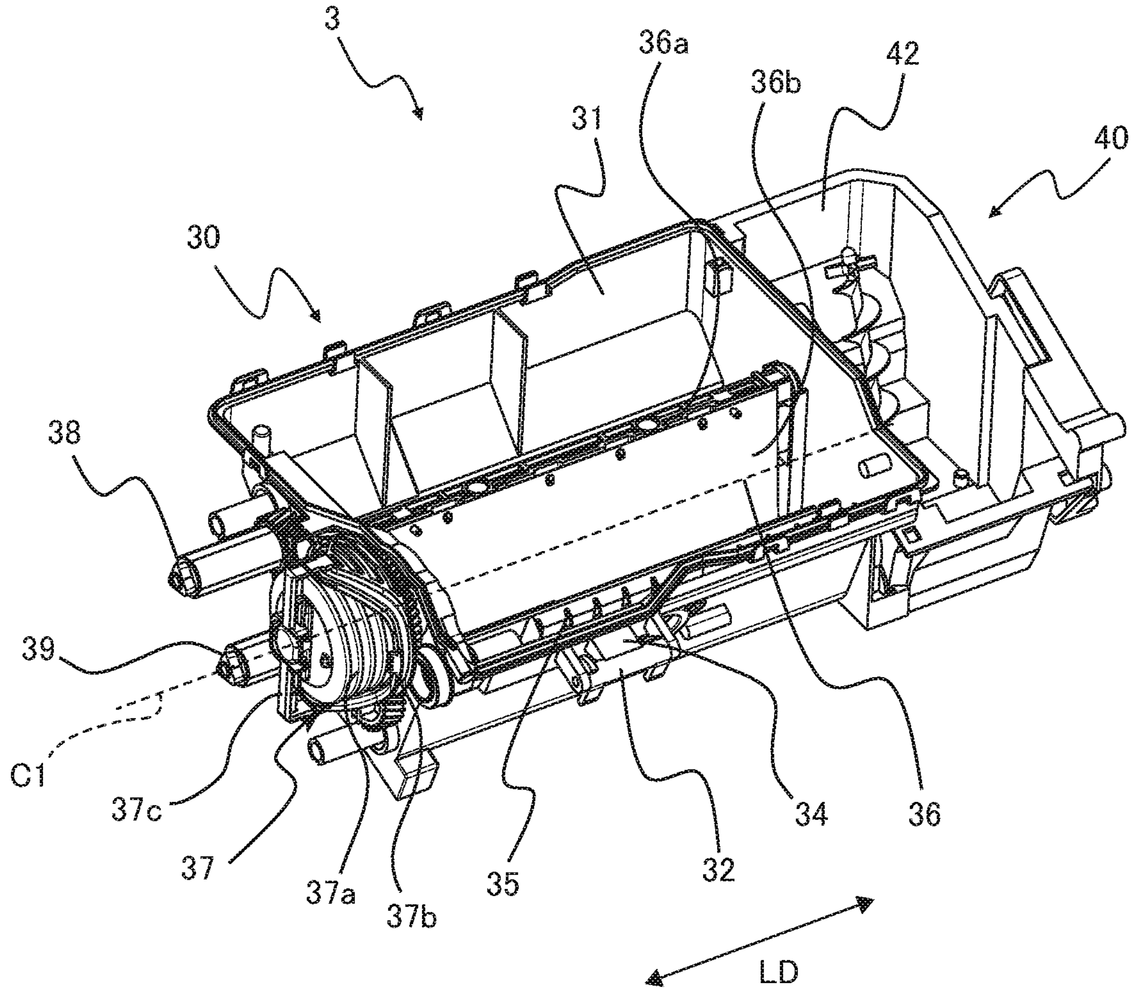
FIG. 6 is a perspective view illustrating the toner cartridge with a cover member removed therefrom.
Figure 7:
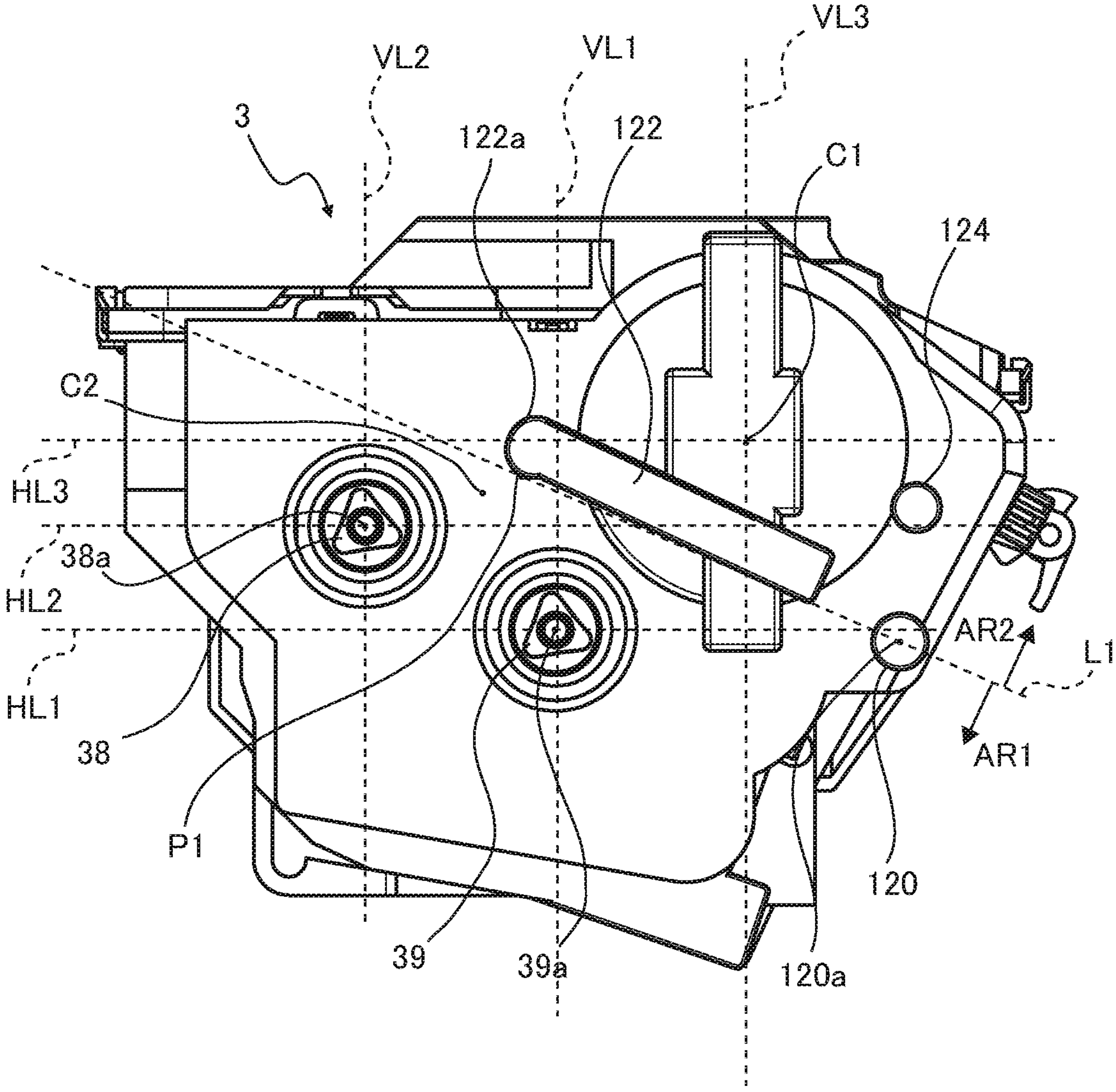
FIG. 7 is a side view illustrating the toner cartridge.
Figure 8:
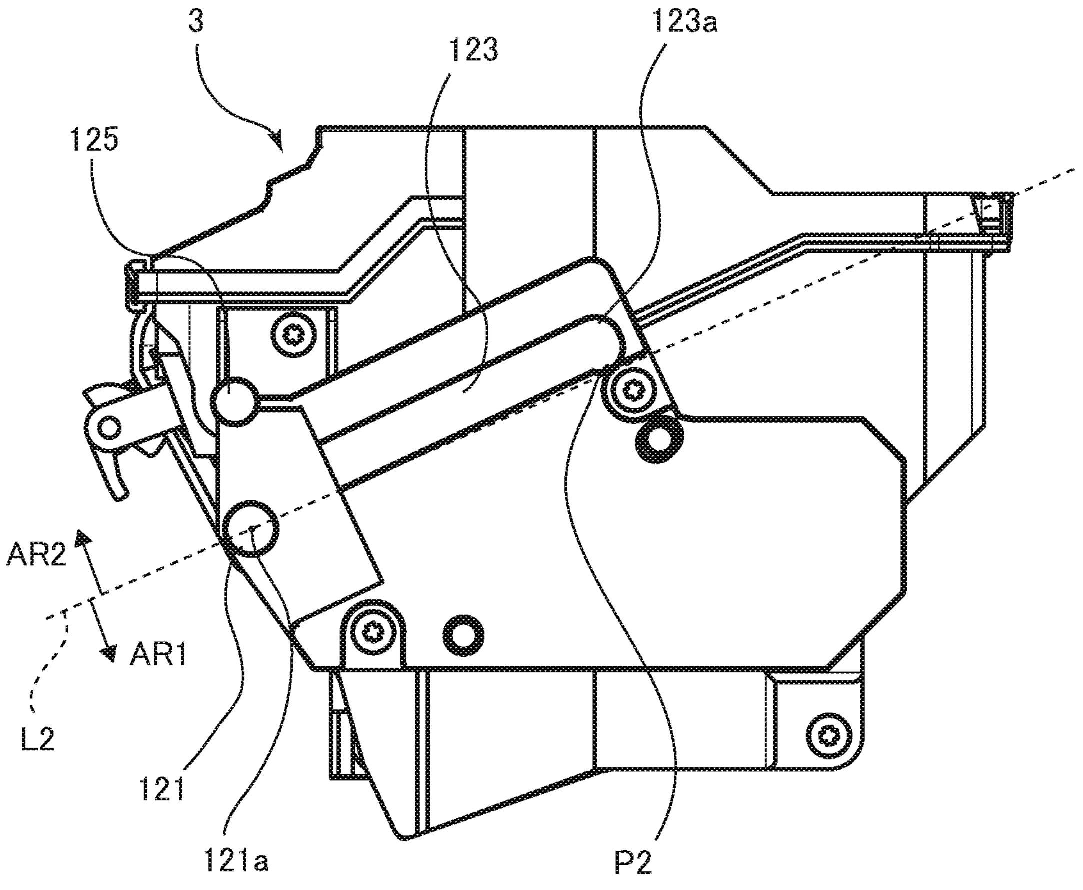
FIG. 8 is a side view illustrating the toner cartridge.
Figure 9:
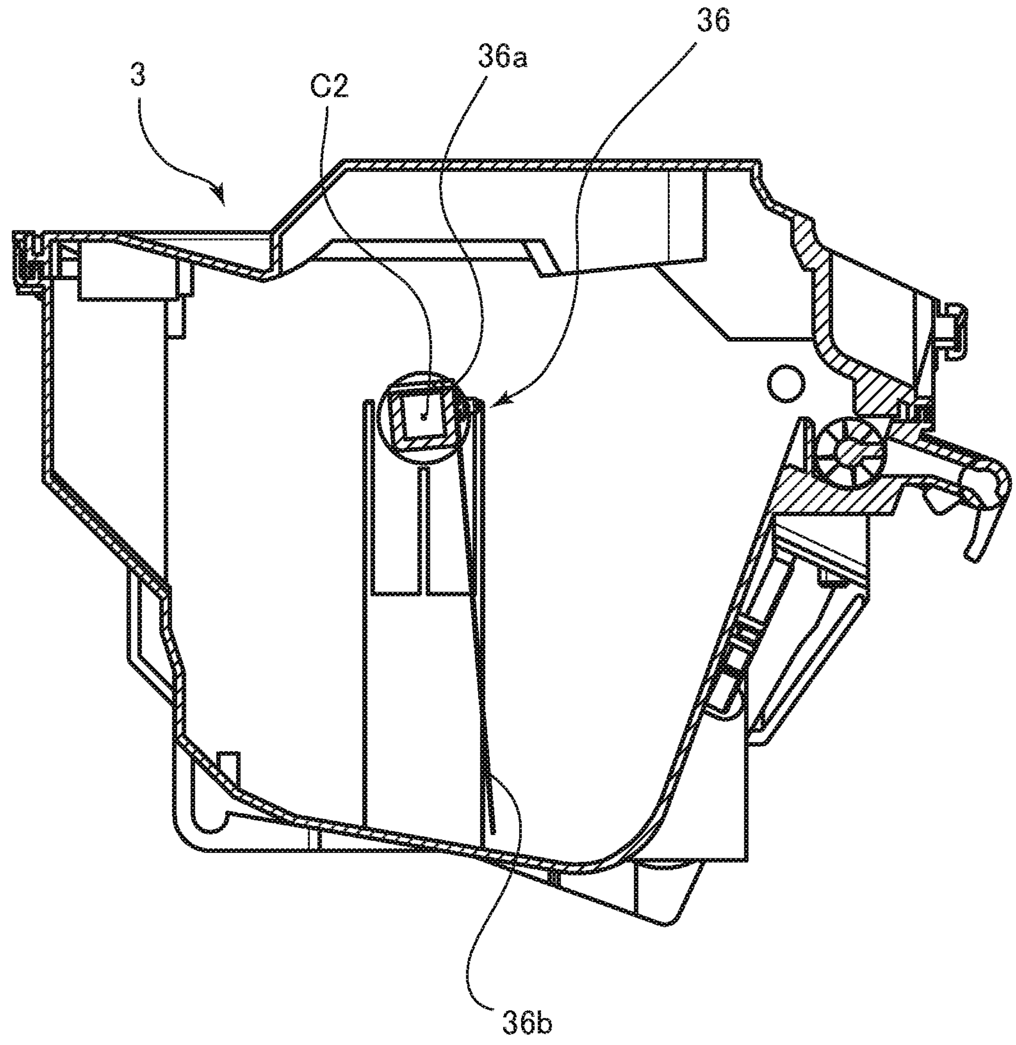
FIG. 9 is a sectional view illustrating the toner cartridge.

Next, a configuration of the toner cartridge 3 will be described in detail using FIGS. 5A to 9. FIG. 5A is a perspective view of the toner cartridge 3 from the upper right, and FIG. 5B is a perspective view of the toner cartridge 3 from the upper left. FIG. 6 is a perspective view illustrating the toner cartridge 3 with a cover member removed therefrom. FIG. 7 is a side view of the toner cartridge 3 from the right. FIG. 8 is aside view of the toner cartridge 3 from the left. FIG. 9 is a sectional view illustrating a section of the toner cartridge 3 perpendicularly intersecting the longitudinal direction LD.

As illustrated in FIGS. 5A to 6, the toner cartridge 3 includes a toner supply portion 30 that supplies toner to the process cartridge 2 and a waste toner collecting portion 40 that collects waste toner from the process cartridge 2.

The toner supply portion 30 includes a toner storage portion 31 that serves as a storage portion that accommodates the toner and a toner discharge port 32 that discharges the toner. The toner supply portion 30 includes a screw member 35 that transports the toner toward the toner discharge port 32, a toner stirring unit 36 that transports the toner toward the screw member 35, and a pump unit 37. Additionally, the toner supply portion 30 includes a first drive input portion 39 and a second drive input portion 38 that rotate in response to inputs of a drive force from the printer body 1. The drive force input to the first drive input portion 39 that serves as a drive input portion drives and rotates the pump unit 37 and the screw member 35. The drive force input to the second drive input portion 38 drives and rotates the toner stirring unit 36.

As illustrated in FIG. 6, the screw member 35 and the toner stirring unit 36 are rotated by drive forces transmitted from the first drive input portion 39 and the second drive input portion 38, respectively, and transport and stir the toner in the toner storage portion 31. The toner stirring unit 36 that serves as a stirring unit includes a shaft portion 36*a* that rotates about a rotation center C2 in response to a transmitted drive force and a stirring portion 36*b* that projects in the radial direction from the shaft portion 36*a* and transports and stirs the toner by rotating along with the shaft portion 36*a* The shaft portion 36*a* extends in the longitudinal direction LD to penetrate through the toner storage portion 30*a*. The stirring portion 36*b* is formed of a resin sheet with flexibility, for example. The toner transported to the toner discharge port 32 by the toner stirring unit 36 and the screw member 35 is discharged from the toner discharge port 32 by the pump unit 37. A shutter member 34 opening the toner discharge port 32 in a closed state in conjunction with attachment of the toner cartridge 3 to the printer body 1 is provided outside the toner storage portion 31.

The pump unit 37 includes a pump 37*a* that communicates with the toner storage portion 31 and is configured to change the internal volume by expanding or contracting in the longitudinal direction LD and a cam member 37*b* that is configured to be rotatable about a rotation center C1. Further, the pump unit 37 includes a link arm 37*c* that causes the pump 37*a* to expand or contract in the longitudinal direction LD by performing linear motion in the longitudinal direction LD in response to a rotation of the cam member 37*b*. A groove portion is formed in the outer circumferential surface of the cam member 37*b*, and a projecting portion that is engaged with the groove portion of the cam member 37*b* is formed in the link arm 37*c*.

The pump 37*a* has a cylindrical outer shape, and a side surface portion of the cylindrical shape is formed into a bellows-like shape. Therefore, the pump 37*a* can expand and stretch in a direction that follows the direction of the rotation center C1 that is a center axis of the cylindrical shape. The cam member 37*b* of the pump unit 37 rotates with rotation of the first drive input portion 39. Then, the link arm 37*c* performs linear motion (reciprocation) in the longitudinal direction LD in response to the rotation of the cam member

37*b*, and the pump 37*a* expands or contracts. In other words, the cam member 37*b* and the link arm 37*c* configure a cam mechanism that converts the rotation drive force input to the toner cartridge 3 into linear motion in the contracting direction and the expansion direction opposite thereto of the pump 37*a* and drives the pump 37*a* Once the pump unit 37 receives rotation driving, the pump 37*a* expands or contracts and changes the internal pressure of the toner storage portion 31 with which the pump 37*a* communicates to thereby discharge the toner from the toner discharge port 32 to the process cartridge 2.

The waste toner collecting portion 40 includes a receiving port 41 that receives waste toner that has passed through the waste toner conveyance path 15 of the process cartridge 2 and accommodates the waste toner entering it from the receiving port 41 in the waste toner storage chamber 42.

In the present embodiment, since the second drive input portion 38 and the first drive input portion 39 are separately provided in the toner cartridge 3, the second drive input portion 38 and the first drive input portion 39 can receive a drive force from the printer body 1 independently from each other. Therefore, it is possible to independently drive-control the toner stirring unit 36, the pump unit 37, and the screw member 35. Specifically, the toner stirring unit 36 is continuously driven during image formation, while the pump unit 37 and the screw member 35 can be intermittently driven only at a timing when it is necessary to refill the process cartridge 2 with the toner.

The toner cartridge 3 includes positioning bosses 120 and 121 projecting in the left-right direction as illustrated in FIGS. 5A to 9. The positioning bosses 120 and 121 that serve as the second positioned portions are formed into columnar shapes and are disposed on the side downstream the toner cartridge 3 in the attachment direction AD. Also, the toner cartridge 3 includes guided portions 122 and 123 projecting in the left-right direction, and the guided portions 122 and 123 extend in the attachment direction AD. Additionally, rotation stopper portions 122*a* and 123*a* that serve as the first positioned portions are provided at ends of the guided portions 122 and 123 on the side upstream in the attachment direction AD, respectively. The rotation stopper portion 122*a* is formed integrally with the guided portion 122, and the rotation stopper portion 123*a* is formed integrally with the guided portion 123. Further, the toner cartridge 3 includes pressed portions 124 and 125 projecting in the left-right direction, and the pressed portions 124 and 125 are disposed above the positioning bosses 120 and 121, respectively.

In this manner, the positioning boss 120, the guided portion 122, the rotation stopper portion 122*a*, and the pressed portion 124 are provided on the right side of the toner cartridge 3. The positioning boss 121, the guided portion 123, the rotation stopper portion 123*a*, and the pressed portion 125 are provided on the left side of the toner cartridge 3.

The positioning bosses 120 and 121 that serve as the second positioned portions are disposed at positions that are different from those of the rotation stopper portions 122*a*, and 123*a* in the attachment direction AD. More specifically, the positioning bosses 120 and 121 are disposed downstream the rotation stopper portions 122*a* and 123*a* in the attachment direction AD. Additionally, the positioning bosses 120 and 121 are disposed such that at least a part thereof overlap the rotation stopper portions 122*a* and 123*a* when seen in the attachment direction AD. It is possible to reduce the sizes of guide rails 130 and 131 and guide members 132 and 133, which are provided in the printer body 1 and will be described below, by disposing the positioning bosses 120 and 121 and the rotation stopper portions 122*a* and 123*a* in this manner.

FIGS. 7 to 9 are diagrams illustrating the toner cartridge 3 in a posture in which the toner cartridge 3 is attached to the printer body 1. As illustrated in FIG. 7, a case where division is made into a first area AR1 and a second area AR2 along a straight line L1 passing through a contact part P1 and a center 120*a* of the positioning boss 120 when seen from the longitudinal direction LD that is a direction of the rotational axis of the photosensitive drum 11 will be considered. The contact part P1 is a part where the rotation stopper portion 122*a* and a contact surface 130*d* (see FIG. 12A) come into contact with each other in a state where the toner cartridge 3 is attached to the printer body 1 as will be described below. At this time, a rotation center 39*a* of the first drive input portion 39 and a rotation center 38*a* of the second drive input portion 38 are disposed in the first area AR1, and a rotation center C1 of the cam member 37*b* is disposed in the second area AR2. Also, the rotation center C2 of the toner stirring unit 36 is disposed in the first area AR1. Note that in FIG. 7, a straight line passing through the rotation center 39*a* of the first drive input portion 39 and extending in the vertical direction is illustrated as a straight line VL1 and a straight line passing through the rotation center 39*a* of the first dive input portion 39 and extending in the horizontal direction is illustrated as a straight line HL1. Also, in FIG. 7, a straight line passing through the rotation center 38*a* of the second drive input portion 38 and extending in the vertical direction is illustrated as a straight line VL2, and a straight line passing through the rotation center 38*a* of the second drive input portion 38 and extending in the horizontal direction is illustrated as a straight line HL2. Further, a straight line passing through the rotation center C1 of the cam member 37*b* and extending in the vertical direction is illustrated as a straight line VL3, and a straight line passing through the rotation center C1 of the cam member 37*b* and extending in the horizontal direction is illustrated as a straight line HL3 in FIG. 7.

Similarly, as illustrated in FIG. 8, a case where division is made into the first area AR1 and a second area AR2 along a straight line L2 passing through the contact part P2 and the center 121*a* of the positioning boss 121 when seen from the longitudinal direction LD that is the direction of the rotational axis of the photosensitive drum 11 will be considered. The contact part P2 is a part where the rotation stopper portion 123*a* and a contact surface 131*d* (see FIG. 12B) come into contact with each other in a state where the toner cartridge 3 is attached to the printer body 1 as will be described below. Similarly to FIG. 7, the rotation center 39*a* of the first drive input portion 39 and the rotation center 38*a* of the second drive input portion 38 are disposed in the first area AR1, and the rotation center C1 of the cam member 37*b* is disposed in the second area AR2 in this case as well. Also, the rotation center C2 of the toner stirring unit 36 is disposed in the first area AR1.

Attachment of Process Cartridge and Toner Cartridge

Next, a configuration for attaching the process cartridge 2 and the toner cartridge 3 to the printer body 1 and a configuration for positioning the process cartridge 2 and the toner cartridge 3 will be described using FIGS. 10 to 12B.

Figure 10:
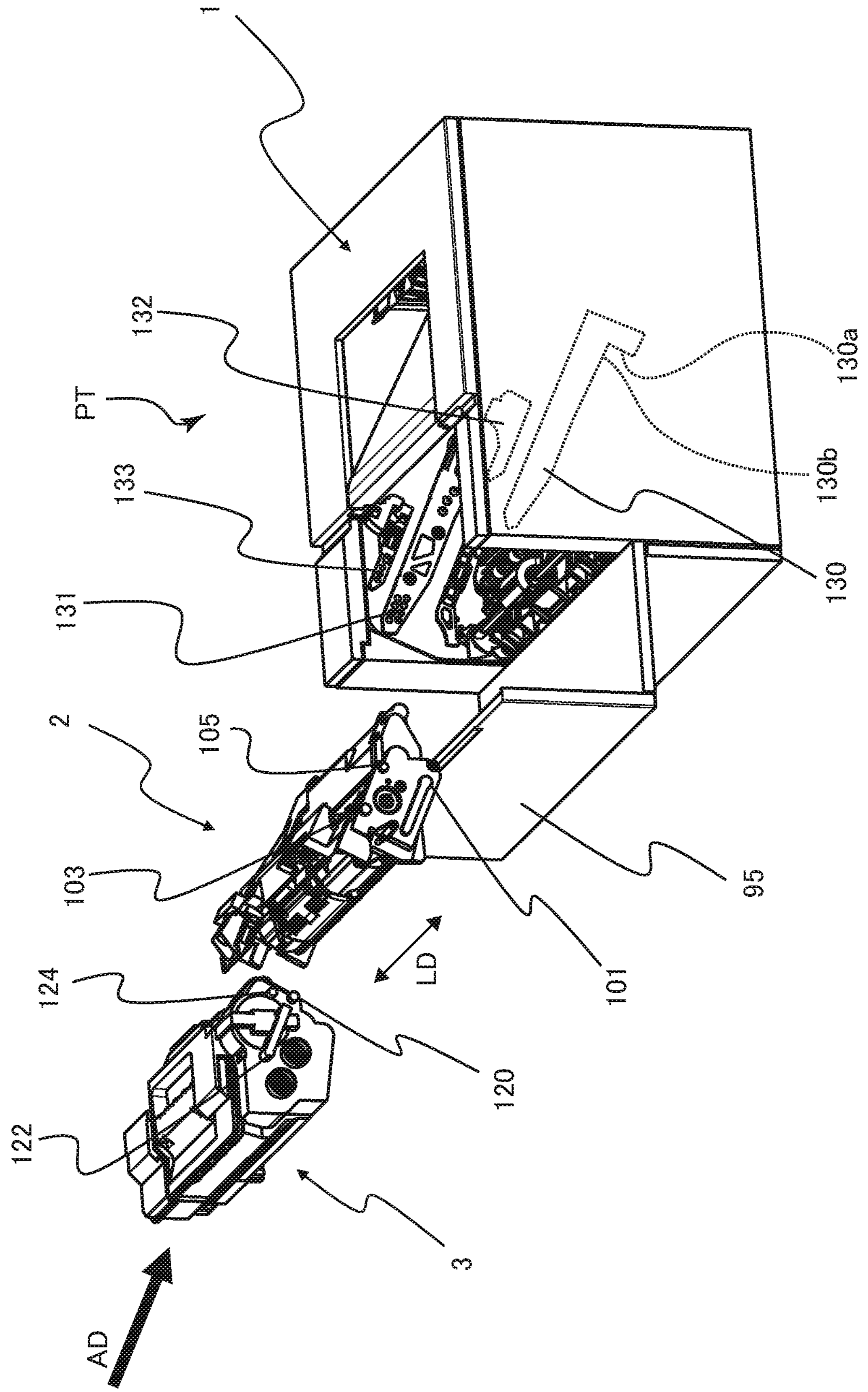
FIG. 10 is a perspective view illustrating the printer in a state where an opening/closing door is opened.
Figure 11A:
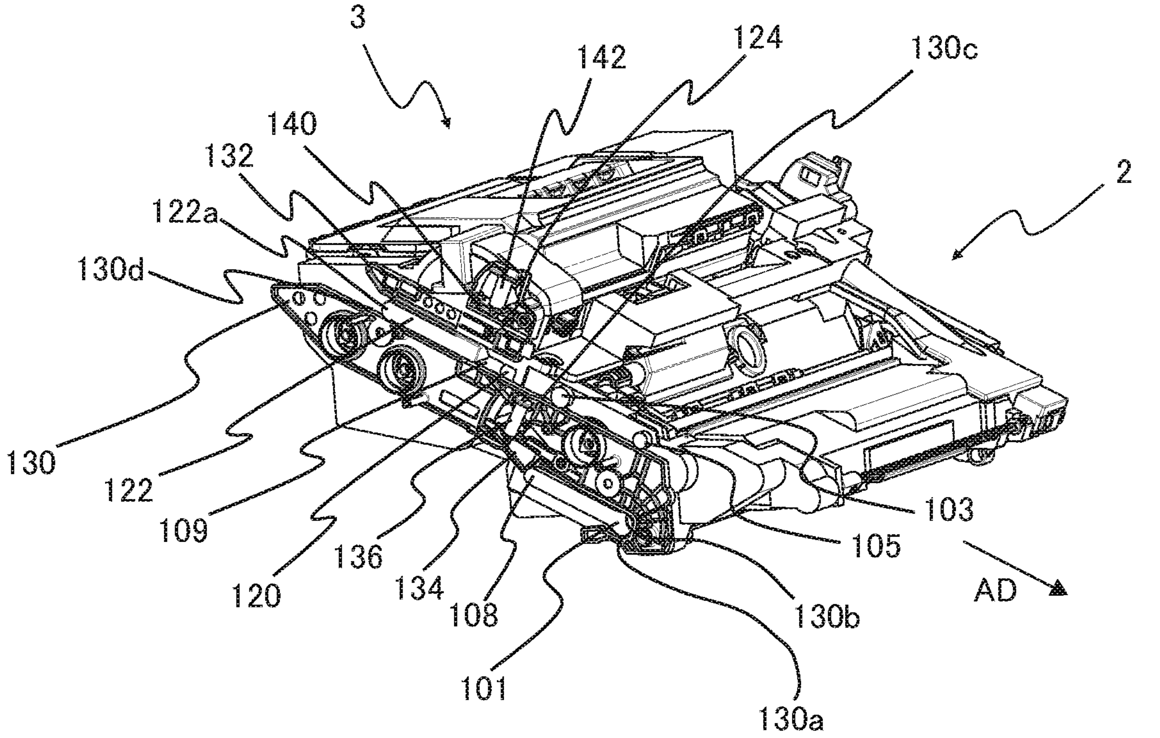
FIG. 11A is a perspective view illustrating a guide rail and the process cartridge provided in the printer body.
Figure 11B:
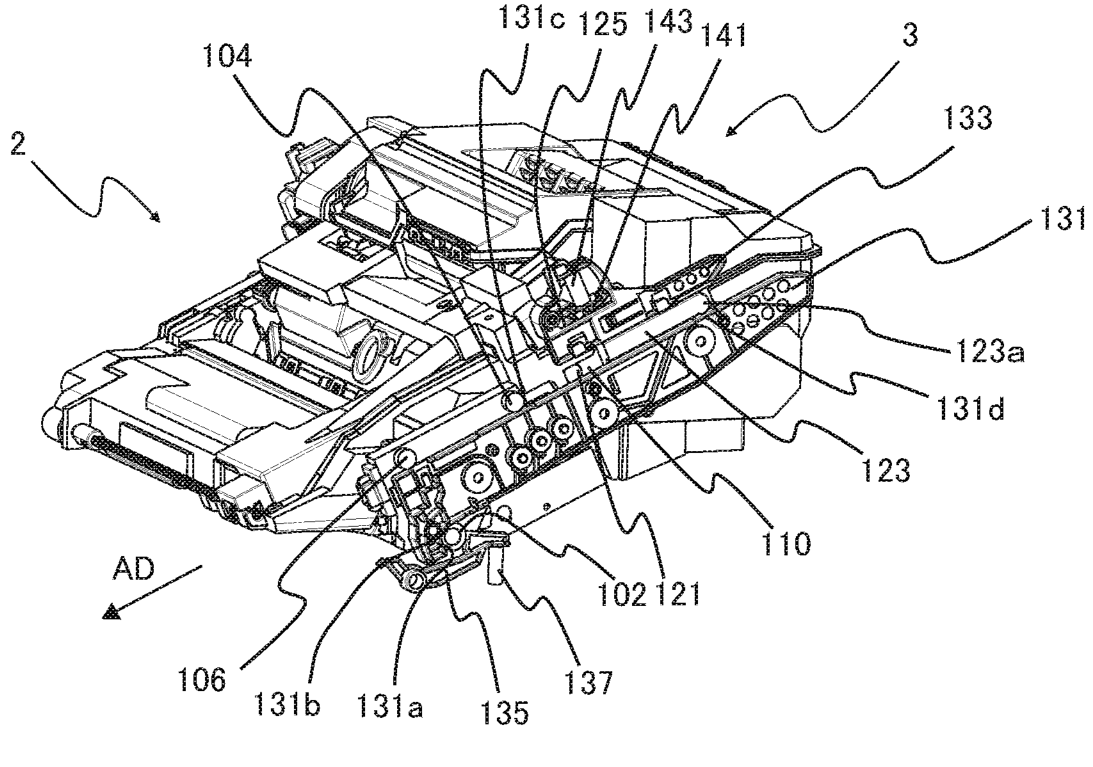
FIG. 11B is another perspective view illustrating the guide rail and the process cartridge provided in the printer body.
Figure 12A:
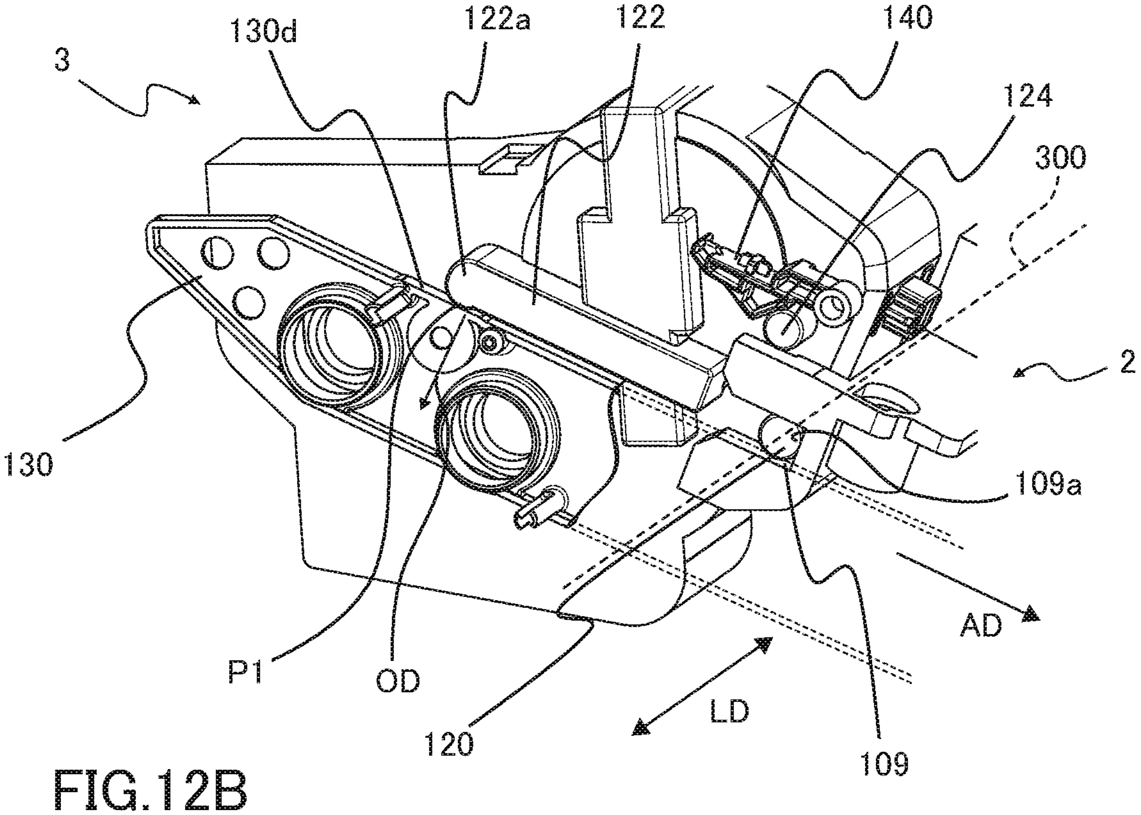
FIG. 12A is an enlarged perspective view illustrating a configuration for positioning the toner cartridge.
Figure 12B:
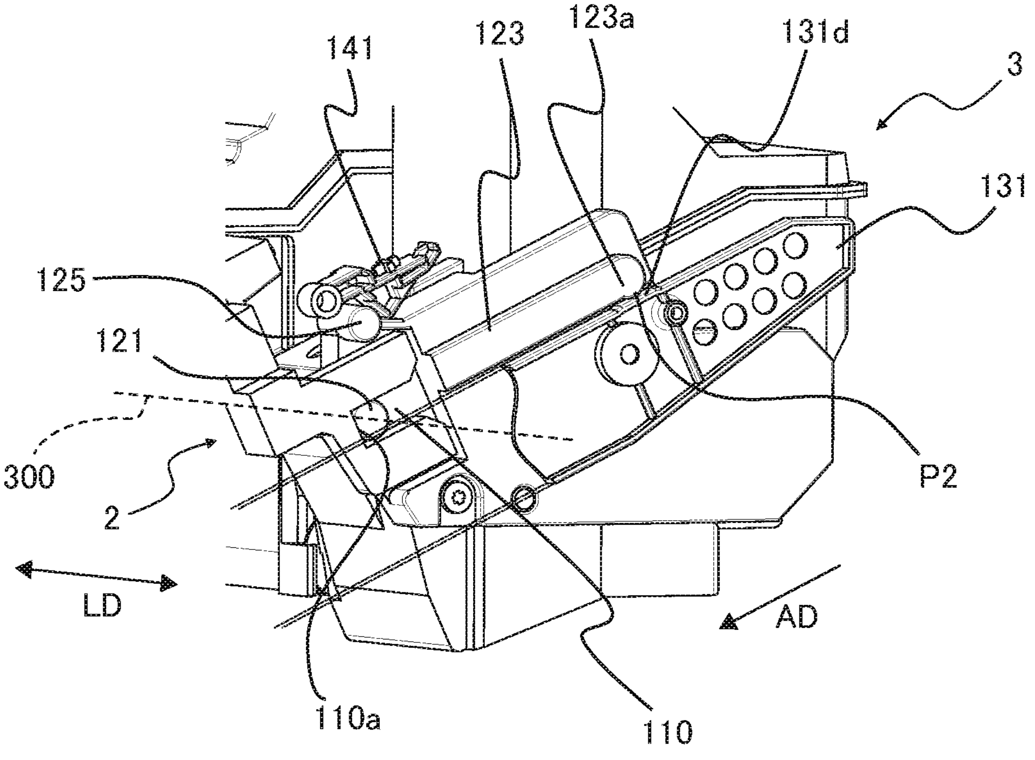
FIG. 12B is another enlarged perspective view illustrating the configuration for positioning the toner cartridge.

FIG. 10 is a perspective view illustrating the printer PT in a state where an opening/closing door 95 is opened. FIG. 11A is a perspective view of the guide rail and the process cartridge 2 provided in the printer body 1 when seen from the upper right side. FIG. 11B is a perspective view of the guide rail and the process cartridge 2 provided in the printer body 1 when seen from the upper left side. FIG. 12A is an enlarged perspective view of a configuration for positioning the toner cartridge 3 when seen from the upper right side, and FIG. 12B is an enlarged perspective view of a configuration for positioning the toner cartridge 3 when seen from the upper left side.

As illustrated in FIG. 10, the printer body 1 has the opening/closing door 95 that is able to open and close, and the internal space of the printer body 1 is exposed by the opening/closing door 95 being opened. The process cartridge 2 and the toner cartridge 3 are directed to the internal space and are attached to the attachment direction AD. The attachment direction AD is a direction that perpendicularly intersects the longitudinal direction LD of the process cartridge 2 and the toner cartridge 3. In other words, the attachment direction AD is a direction that perpendicularly intersects the direction of the rotational axis 11*a* of the photosensitive drum 11.

The printer body 1 includes guide rails 130 and 131 and guide members 132 and 133 disposed above the guide rails 130 and 131 as illustrated in FIGS. 10, 11A, and 11B. The guide rail 130 and the guide member 132 are disposed on the right side of the printer body 1 in the longitudinal direction LD, and the guide rail 131 and the guide member 133 are disposed on the left side of the printer body 1 in the longitudinal direction LD.

The guide rails 130 and 131 include contact surfaces 130*a* and 131*a* and contact surfaces 130*b* and 131*b* coming into contact with the positioning bosses 101 and 102 of the process cartridge 2, respectively. The contact surfaces 130*a* and 131*a* extend in a direction perpendicular to the attachment direction AD, and the contact surfaces 130*b* and 131*b* extend in parallel to the attachment direction AD.

Further, the guide rails 130 and 131 include contact surfaces 130*c* and 131*c* and contact surfaces 130*d* and 131*d* extending in parallel to the attachment direction AD. The contact surfaces 130*c* and 131*c* come into contact with the rotation stopper bosses 103 and 104 of the process cartridge 2, and the contact surfaces 130*d* and 131*d* come into contact with the rotation stopper portions 122*a* and 123*a* of the toner cartridge 3.

Also, the printer body 1 includes process cartridge pressing members 134 and 135 for pressing the process cartridge 2 and elastic members 136 and 137 for giving a pressing force to the process cartridge pressing members 134 and 135. The process cartridge pressing member 134 disposed on the right side of the printer body 1 is rotatably held by the guide rail 130. The process cartridge pressing member 135 disposed on the left side of the printer body 1 is rotatably held by a conveyance guide which is disposed below the guide rail 131 and is not illustrated in the drawing.

Additionally, the printer body 1 includes toner cartridge pressing members 140 and 141 for pressing the toner cartridge 3 and elastic members 142 and 143 for giving a pressing force to the toner cartridge pressing members 140 and 141. The toner cartridge pressing members 140 and 141 are rotatably held by the guide members 132 and 133, respectively.

In a case where the process cartridge 2 is attached to (inserted into) the printer body 1, the guide boss 105 and the rotation stopper boss 103 on the right side of the process cartridge 2 enter the part above the guide rail 130, and the positioning boss 101 enters the part below the guide rail 130. Similarly, the guide boss 106 and the rotation stopper boss 104 on the left side of the process cartridge 2 enter the part above the guide rail 131, and the positioning boss 102 enters the part below the guide rail 131. In this manner, the position of the process cartridge 2 in the up-down direction is restricted, and the process cartridge 2 can be inserted along the guide rails 130 and 131, when the process cartridge 2 is attached to the printer body 1.

Then, if the process cartridge 2 advances in the attachment direction AD inside the printer body 1, the positioning boss 101 of the process cartridge 2 comes into contact with the contact surface 130*a* of the guide rail 130. In addition, the positioning boss 102 of the process cartridge 2 comes into contact with the contact surface 131*a* of the guide rail 131. In this manner, the process cartridge 2 is positioned with respect to the printer body 1 in the attachment direction AD.

Thereafter, the positioning boss 101 of the process cartridge 2 comes into contact with the contact surfaces 130*a* and 130*b* of the guide rail 130 due to balance between the pressing force from the process cartridge pressing members 134 and 135 and other extremal forces, which are not illustrated. Also, the rotation stopper boss 103 of the process cartridge 2 comes into contact with the contact surface 130*c* of the guide rail 130.

Similarly, the positioning boss 102 of the process cartridge 2 comes into contact with contact surfaces 131*a* and 131*b* of the guide rail 131. Additionally, the rotation stopper boss 104 of the process cartridge 2 comes into contact with the contact surface 131*c* of the guide rail 131. Rotation of the process cartridge 2 around the positioning bosses 101 and 102 is restricted by the rotation stopper bosses 103 and 104 of the process cartridge 2 coming into contact with the contact surfaces 130*c* and 131*c* of the guide rails 130 and 131.

In other words, the process cartridge 2 is positioned in a direction orthogonal to the attachment direction AD and the longitudinal direction LD with respect to the printer body 1. At this time, the guide bosses 105 and 106 are separated from the guide rails 130 and 131, respectively. In this manner, the process cartridge 2 is positioned with respect to the printer body 1 in a state where it is attached to the printer body 1.

The toner cartridge 3 is attached to the printer body 1 after the attachment of the process cartridge 2 to the printer body 1 is completed. In a case where the toner cartridge 3 is attached to (inserted into) the printer body 1, the guided portion 122 on the right side of the toner cartridge 3 enters the part between the guide member 132 and the guide rail 130. Similarly, the guided portion 123 on the left side of the toner cartridge 3 enters the part between the guide member 133 and the guide rail 131. In this manner, the position of the toner cartridge 3 in the up-down direction is restricted, and the toner cartridge 3 can be inserted along the guide rails 130 and 131 when the toner cartridge 3 is attached to the printer body 1.

Then, if the toner cartridge 3 advances in the attachment direction AD inside the printer body 1, the positioning boss 120 of the toner cartridge 3 is engaged with the toner cartridge positioning portion 109 provided in the process cartridge 2 as illustrated in FIGS. 12A and 12B. Also, the positioning boss 121 of the toner cartridge 3 is engaged with the toner cartridge positioning portion 110 provided in the process cartridge 2. The toner cartridge positioning portions 109 and 110 that serve as the second positioning portions include abutment surfaces 109*a* and 110*a* extending m the direction orthogonal to the attachment direction AD and the longitudinal direction LD, respectively. The positioning bosses 120 and 121 abut the abutment surfaces 109*a* and 110*a* In this manner, the toner cartridge 3 is positioned with respect to the process cartridge 2 in the attachment direction AD. In other words, the position of the toner cartridge 3 in the attachment direction AD with respect to the printer body 1 is determined via the process cartridge 2 by the positioning bosses 120 and 121 coming into contact with the toner cartridge positioning portions 109 and 110.

Thereafter, the rotation stopper portion 122*a* on the right side of the toner cartridge 3 comes into contact with the contact surface 130*d* of the guide rail 130 due to balance between the pressing force from the toner cartridge pressing members 140 and 141 and other extremal forces, which are not illustrate. Similarly, the rotation stopper portion 123*a* on the left side of the toner cartridge 3 comes into contact with the contact surface 131*d* of the guide rail 131. Rotation of the toner cartridge 3 around the positioning bosses 120 and 121 is restricted by the rotation stopper portions 122*a* and 123*a* of the toner cartridge 3 coming into contact with the contact surfaces 130*d* and 131*d* of the guide rails 130 and 131. In other words, the position of the toner cartridge 3 in the orthogonal direction OD that perpendicularly intersects the attachment direction AD with respect to the printer body 1 and the process cartridge 2 is determined.

As described above, the position of the toner cartridge 3 in the attachment direction AD and the orthogonal direction OD that perpendicularly intersects the attachment direction AD with respect to the printer body 1 and the process cartridge 2 is determined. Additionally, the toner cartridge 3 is positioned with respect to the printer body 1 and the process cartridge 2 in a state where it is attached to the printer body 1.

If the opening/closing door 95 is closed after the process cartridge 2 and the toner cartridge 3 are attached to the printer body 1, the printer PT is brought into a state where an image can be formed. A procedure of detaching the process cartridge 2 and the toner cartridge 3 from the printer body 1 is performed in a manner opposite to the above procedure.

As described above, the toner cartridge 3 is positioned in the attachment direction AD by the toner cartridge positioning portions 109 and 110 provided in the process cartridge 2. Also, rotation of the toner cartridge 3 around the positioning bosses 120 and 121 is restricted by the contact surfaces 130*d* and 131*d* of the guide rails 130 and 131 provided in the printer body 1. In other words, rotation of the toner cartridge 3 around a rotation shaft 300 that serves as an axis passing through the centers of the positioning bosses 120 and 121 and extending in the longitudinal direction LD is restricted by the contact surfaces 130*d* and 131*d* that serve as the first positioning portions. The rotation shaft 300 is parallel to the rotational axis 11*a* of the photosensitive drum 11.

In this manner, a load from the toner cartridge 3 can be dispersed to the process cartridge 2 and the printer body 1 by assigning the configuration for positioning the toner cartridge 3 to the process cartridge 2 and the printer body 1. In other words, a part of the weight of the toner cartridge 3 can be supported by the guide rails 130 and 131 of the printer body 1, and it becomes unnecessary to firmly configure the process cartridge 2. Therefore, it is possible to reduce the size of the process cartridge 2 and to increase the capacity of the toner cartridge 3.

Additionally, the toner cartridge 3 is positioned with respect to the process cartridge 2, and it is thus possible to improve accuracy of positioning of the toner cartridge 3 and the process cartridge 2. In addition, the toner cartridge 3 is positioned with respect to the printer body 1, and it is thus possible to accurately determine the relative positional relationship of the process cartridge 2 positioned relative to the printer body 1. Therefore, it is possible to curb toner leakage between the toner cartridge 3 and the process cartridge 2.

As described above, it is possible to improve accuracy of positioning of the toner cartridge 3 with respect to the process cartridge 2 without leading to an increase in size of the process cartridge 2.

Second Embodiment

Next, a second embodiment of the present technology will be described, and the second embodiment is achieved by changing the configuration for positioning the toner cartridge 3 in the first embodiment. Therefore, illustration of configurations similar to those in the first embodiment will be omitted, or such configurations will be described by applying the same reference signs in the drawings.

Figure 13A:
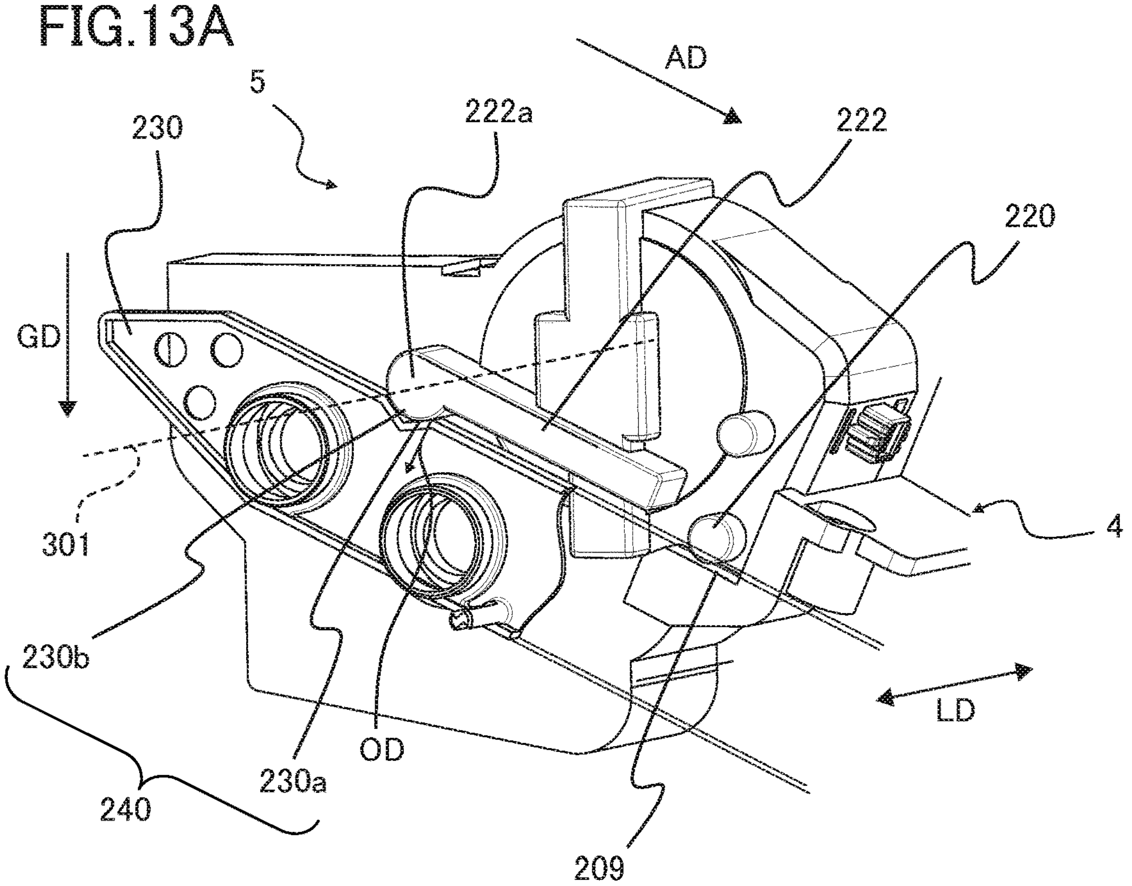
FIG. 13A is an enlarged perspective view illustrating a configuration for positioning a toner cartridge according to a second embodiment.
Figure 13B:
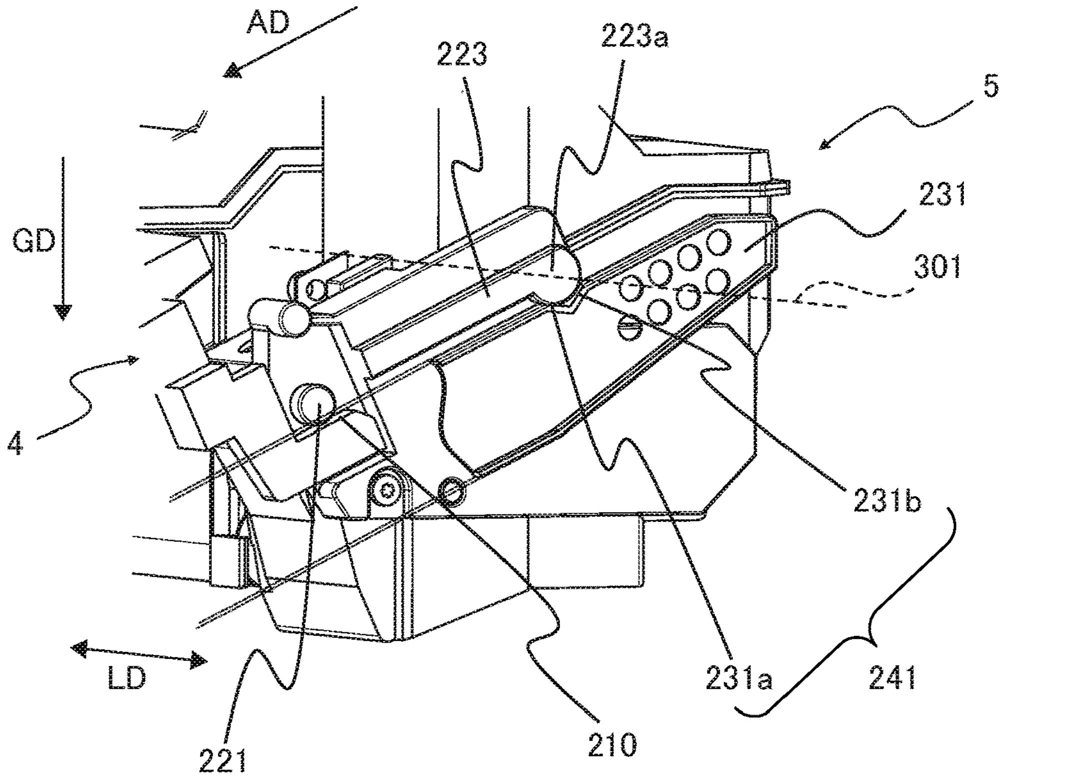
FIG. 13B is another enlarged perspective view illustrating the configuration for positioning the toner cartridge.

FIG. 13A is an enlarged perspective view of a configuration for positioning a toner cartridge 5 when seen from the upper right side according to the second embodiment, and FIG. 13B is an enlarged perspective view of the configuration for positioning the toner cartridge 5 when seen from the upper left side.

A process cartridge 4 that serves as a first cartridge according to the second embodiment includes toner cartridge rotation stopper surfaces 209 and 210 as illustrated in FIGS. 13A and 13B. The toner cartridge rotation stopper surfaces 209 and 210 are disposed at an upstream end portion of the process cartridge 4 in the attachment direction AD.

The toner cartridge 5 that serves as a second cartridge includes rotation stopper bosses 220 and 221 projecting in the left-right direction and guided portions 222 and 223. Positioning portions 222*a* and 223*a* are provided at upstream end portions of the guided portions 222 and 223 in the attachment direction AD, and the positioning portions 222*a* and 223*a* are formed integrally with the guided portions 222 and 223.

The positioning portions 222*a* and 223*a* that serve as the first positioned portions are disposed at positions that are different from those of the rotation stopper bosses 220 and 221 in the attachment direction AD. More specifically, the positioning portions 222*a* and 223*a* are disposed upstream the rotation stopper bosses 220 and 221 in the attachment direction AD. Also, the positioning portions 222*a* and 223*a* are disposed such that at least a part thereof overlaps the rotation stopper bosses 220 and 221 when seen in the attachment direction AD. It is possible to reduce the sizes of guide rails 230 and 231 and guide members 132 and 133, which are provided in the printer body 1 and will be described below, by disposing the positioning portions 222*a* and 223*a* and the rotation stopper bosses 220 and 221 in this manner.

Next, the guide rails 230 and 231 provided in the printer body 1 (see FIG. 1) will be described. The guide rail 230 is disposed on the right side of the printer body 1 and includes a first contact surface 230*a* and a second contact surface 230*b*. The first contact surface 230*a* and the second contact surface 230*b* are inclined with respect to the attachment direction AD and the gravity direction GD and can come into contact with the positioning portion 222*a* of the toner cartridge 5. Similarly, the guide rail 231 is disposed on the left side of the printer body 1 and includes a first contact surface 231*a* and a second contact surface 231*b*. The first contact surface 231*a* and the second contact surface 231*b* are inclined with respect to the attachment direction AD and the gravity direction GD and can come into contact with the positioning portion 223*a* of the toner cartridge 5.

More specifically, the first contact surfaces 230*a* and 231*a* that serve as first surfaces extend downstream in the gravity direction GD, that is, downward as the first contact surfaces 230*a* and 231*a* extend upstream in the attachment direction AD. The second contact surfaces 230*b* and 231*b* that serve as second surfaces are disposed upstream of the first contact surfaces 230*a* and 231*a* in the attachment direction AD and extend upstream in the gravity direction GD, that is, upward as the second contact surfaces 230*b* and 231*b* extend upstream in the attachment direction AD. In this manner, the first contact surface 230*a* and the second contact surface 230*b* forma V-shaped groove portion 240 as a whole. In addition, the first contact surface 231*a* and the second contact surface 231*b* also form a V-shaped groove portion 241 as a whole. These groove portions 240 and 241 configure first positioning portions that position the toner cartridge 5 in the attachment direction AD with respect to the printer body 1.

Next, an attachment method and a positioning method of the toner cartridge 5 will be described. Note that the attachment method and the positioning method of the process cartridge 2 are similar to those in the first embodiment and description thereof will be omitted.

In a case where the toner cartridge 5 is attached to (inserted into) the printer body 1, the guided portion 222 on the right side of the toner cartridge 5 enters the part between the guide member 132 (see FIG. 10) and the guide rail 230. Similarly, the guided portion 223 on the left side of the toner cartridge 5 enters the part between the guide member 133 (see FIG. 10) and the guide rail 231. In this manner, the position of the toner cartridge 5 in the up-down direction is restricted, and the toner cartridge 5 can be inserted along the guide rails 230 and 231, when the toner cartridge 5 is attached to the printer body 1.

Then, if the toner cartridge 5 advances in the attachment direction AD inside the printer body 1, the positioning portion 222*a* of the toner cartridge 5 drops in the groove portion 240 provided at the guide rail 230 as illustrated in FIGS. 13A and 13B. In addition, the positioning portion 223*a* of the toner cartridge 5 drops in the groove portion 241 provided at the guide rail 231. In other words, the positioning portion 222*a* comes into contact with the first contact surface 230*a* and the second contact surface 230*b* of the groove portion 240, and the positioning portion 223*a* comes into contact with the first contact surface 231*a* and the second contact surface 231*b* of the groove portion 241. In this manner, the toner cartridge 5 is positioned with respect to the printer body 1 including the guide rails 230 and 231 in the attachment direction AD.

Thereafter, the rotation stopper boss 220 on the right side of the toner cartridge 5 comes into contact with the toner cartridge rotation stopper surface 209 of the process cartridge 4 due to an action of a pressing member, which is not illustrated. Similarly, the rotation stopper boss 221 on the left side of the toner cartridge 5 comes into contact with the toner cartridge rotation stopper surface 210 of the process cartridge 4. Rotation of the toner cartridge 5 around the positioning portions 222*a* and 223*a* is restricted by the rotation stopper bosses 220 and 221 of the toner cartridge 5 coming into contact with the toner cartridge rotation stopper surfaces 209 and 210 that serve as the second positioning portions. In other words, the position of the toner cartridge 5 in the orthogonal direction OD with respect to the process cartridge 4 is determined. The position of the toner cartridge 5 in the orthogonal direction OD with respect to the apparatus body 1 is determined via the process cartridge 4.

As described above, the position of the toner cartridge 5 in the attachment direction AD and the orthogonal direction OD that perpendicularly intersects the attachment direction AD with respect to the printer body 1 and the process cartridge 2 is determined. Additionally, the toner cartridge 5 is positioned with respect to the printer body 1 and the process cartridge 4 in a state where it is attached to the printer body 1.

If the opening/closing door 95 is closed after the process cartridge 4 and the toner cartridge 5 are attached to the printer body 1, the printer PT is brought into a state where an image can be formed. A procedure of detaching the process cartridge 4 and the toner cartridge 5 from the printer body 1 is performed in a manner opposite to the above procedure.

As described above, the toner cartridge 5 is positioned in the attachment direction AD by the groove portions 240 and 241 provided in the guide rails 230 and 231 of the printer body 1. Also, rotation of the toner cartridge 5 around the positioning portions 222*a* and 223*a* is restricted by the toner cartridge rotation stopper surfaces 209 and 210 provided in the process cartridge 4. In other words, rotation of the toner cartridge 5 around the rotation shaft 301 that serves as an axis passing through the centers of the positioning portions 222*a* and 223*a* and extending in the longitudinal direction LD is restricted by the toner cartridge rotation stopper surfaces 209 and 210. In this manner, it is possible to achieve effects similar to those in the first embodiment. The rotation shaft 301 is parallel to the rotational axis 11*a* of the photosensitive drum 11.

Third Embodiment

Next, a third embodiment of the present technology will be described, and the third embodiment relates to positioning of drum cartridges 6 and developing cartridges 7 unlike the first embodiment. Note that illustration of configurations similar to those in the first embodiment will be omitted or such configurations will be described by applying the same reference signs in the drawings.

Figure 14:
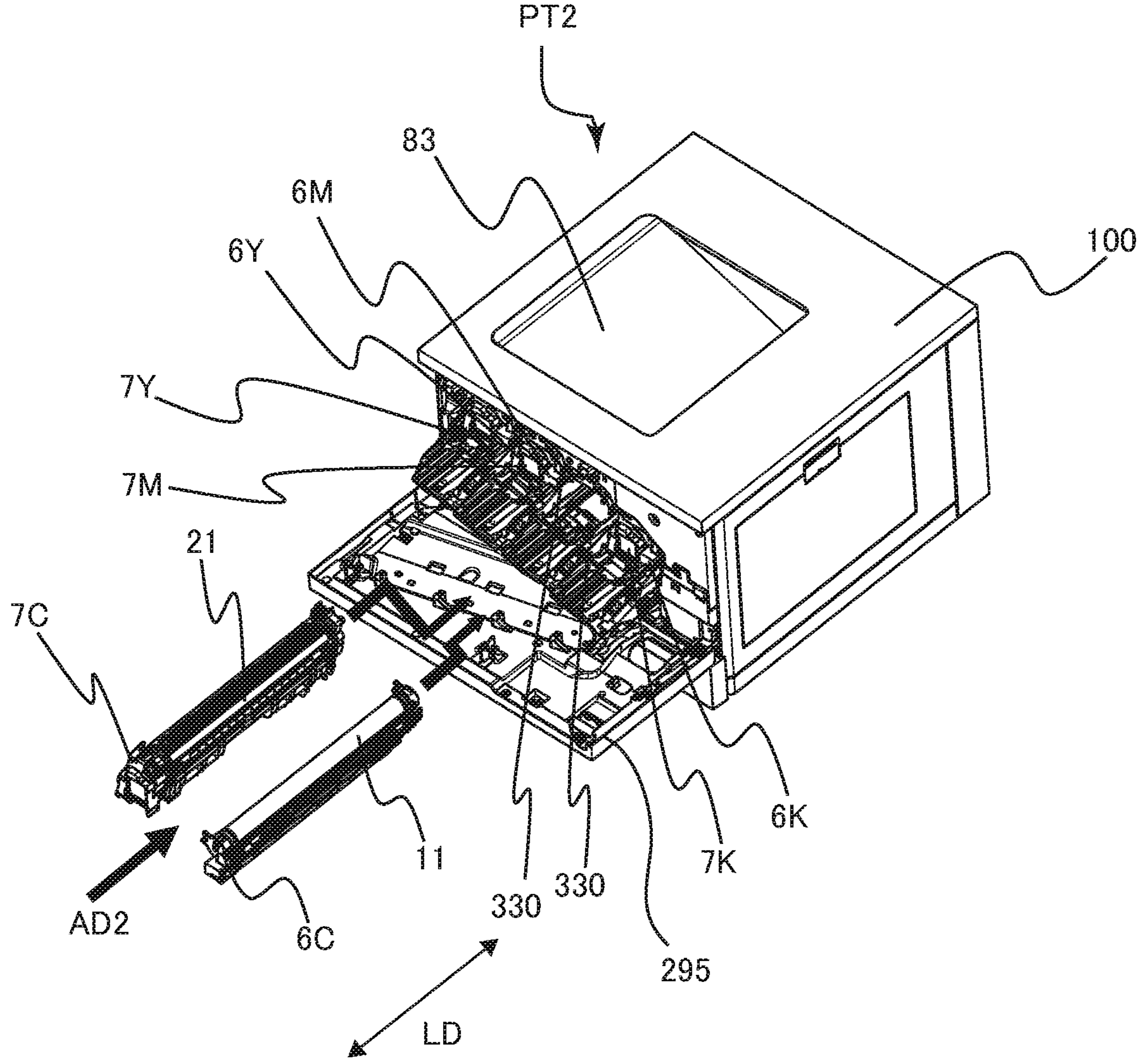
FIG. 14 is a perspective view illustrating a printer according to a third embodiment.

FIG. 14 is a perspective view illustrating a printer PT2 that serves as an image forming apparatus according to the third embodiment. As illustrated in FIG. 14, the printer PT2 is configured of a printer body 10W, drum cartridges 6 (6Y, 6M 6C, 6K) that serve as first cartridges, and developing cartridges 7 (7Y, 7M, 7C, 7K) that serve as second cartridges. Note that although the printer PT2 includes the four drum cartridges and the four developing cartridges corresponding to yellow (Y), magenta (M), cyan (C), and black (K), these are different only in colors of toner images to be formed, and configurations thereof are similar to each other. Therefore, the indexes Y, M, C. and K may be omitted, and they may be expressed as drum cartridges 6 and developing cartridges 7.

The drum cartridges 6 and the developing cartridges 7 are configured to be attachable to and detachable from the printer body 100 in a state where an opening/closing door 295 is opened. Note that FIG. 14 illustrates a state when the drum cartridge 6C and the developing cartridge 7C for cyan are attached to the printer body 100. The printer body 100 that serves as an apparatus body includes a guide rail 330 corresponding to each cartridge, and the drum cartridges 6 and the developing cartridges 7 are attached and detached in the longitudinal direction LD that is parallel to the axis direction of the photosensitive drum 11 along the guide rail 330. Also, the drum cartridges 6 and the developing cartridges 7 are attached in the attachment direction AD2 that is parallel to the longitudinal direction LD with respect to the printer body 100.

The drum cartridge 6 is obtained by forming the cleaning unit 10 (see FIG. 2B) including the photosensitive drum 11, the charging roller 12 and the cleaning blade 13 as a cartridge. The developing cartridge 7 is obtained by forming the developing unit 20 (see FIG. 2B) including the developing roller 21, the developing blade 22, and the developer storage chamber 24 that serves as a storage portion as a cartridge.

The drum cartridge 6 and the developing cartridge 7 of each color are disposed to be adjacent to each other inside the printer body 100. Similarly to the monochrome laser printer described in the first embodiment, a toner image of each color is formed on the photosensitive drum 11 of each color. Thereafter, the toner image of each color is sequentially transferred to an intermediate transfer belt, which is not illustrated, and is transported to the transfer portion 60 in a state where the toner images of the four colors overlap each other. Thereafter, the toner images are transferred to and fixed on the sheet S by the transfer portion 60, and the sheet S is discharged to the sheet discharge tray 83 similarly to the monochrome laser printer described in the first embodiment.

Configuration for Positioning Developing Cartridges

Figure 15A:
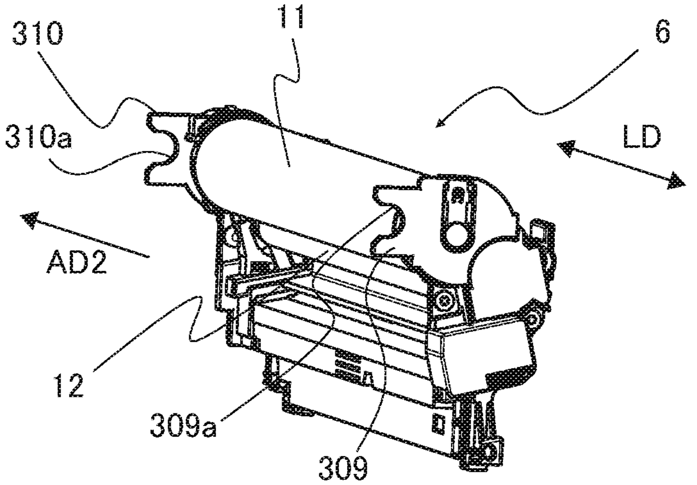
FIG. 15A is a perspective view illustrating a drum cartridge.
Figure 15B:
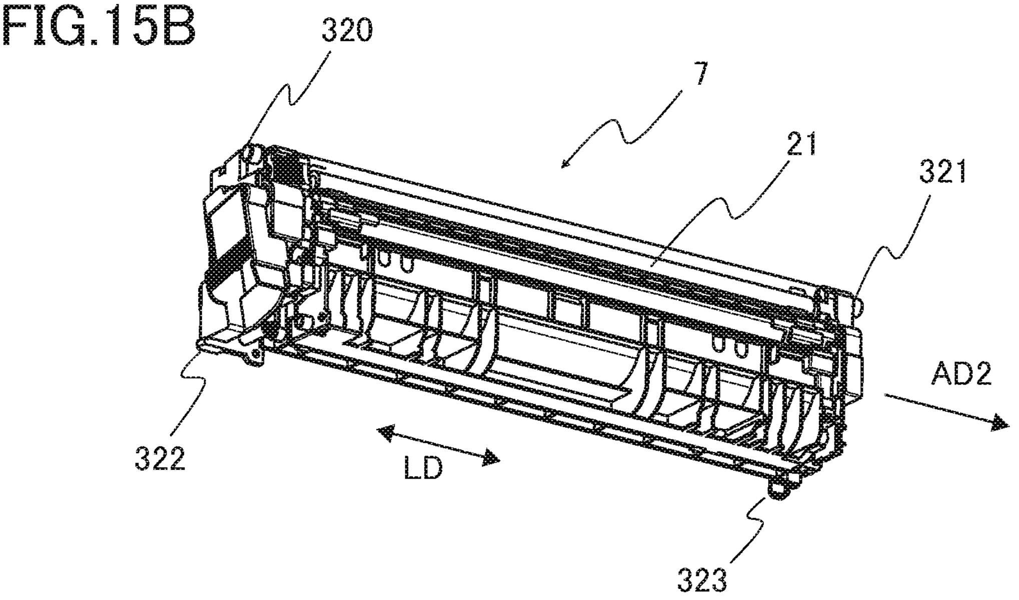
FIG. 15B is a perspective view illustrating a developing cartridge.
Figure 15C:
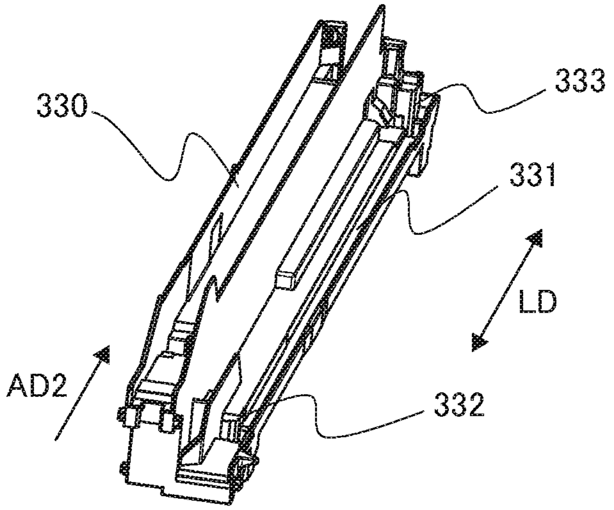
FIG. 15C is a perspective view illustrating a guide rail.
Figure 16A:
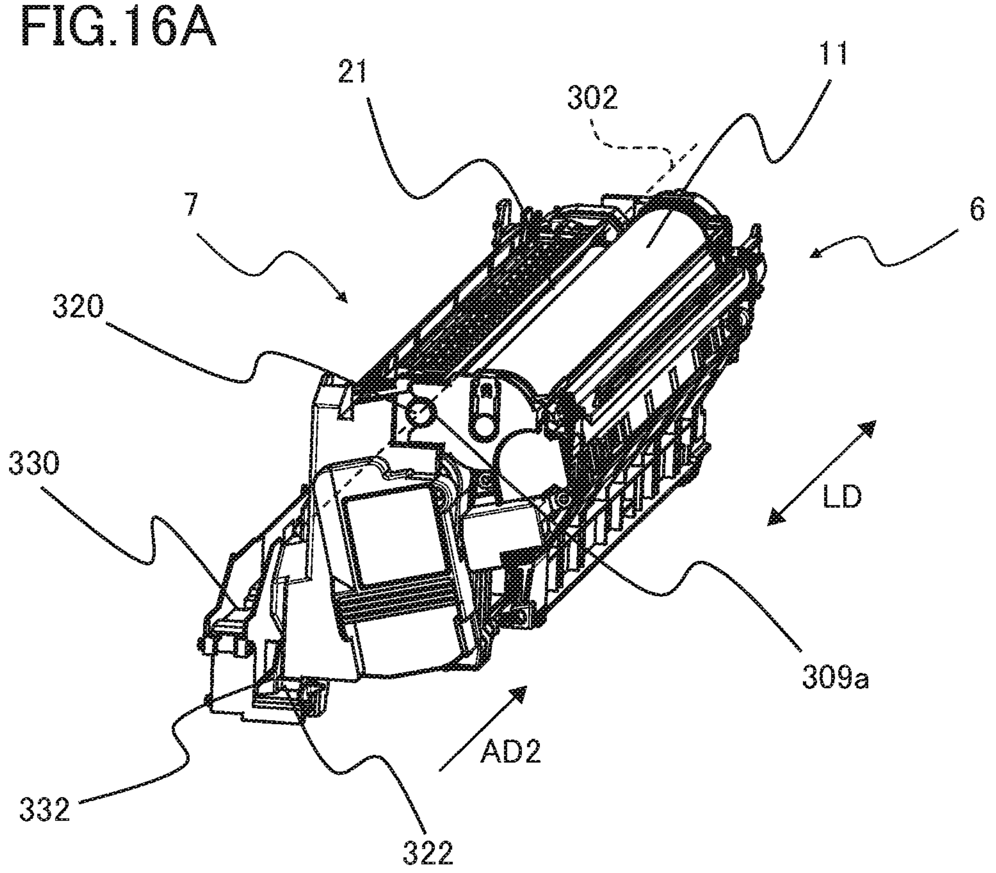
FIG. 16A is a perspective view illustrating the drum cartridge and the developing cartridge in a state where they are attached to a printer body.
Figure 16B:
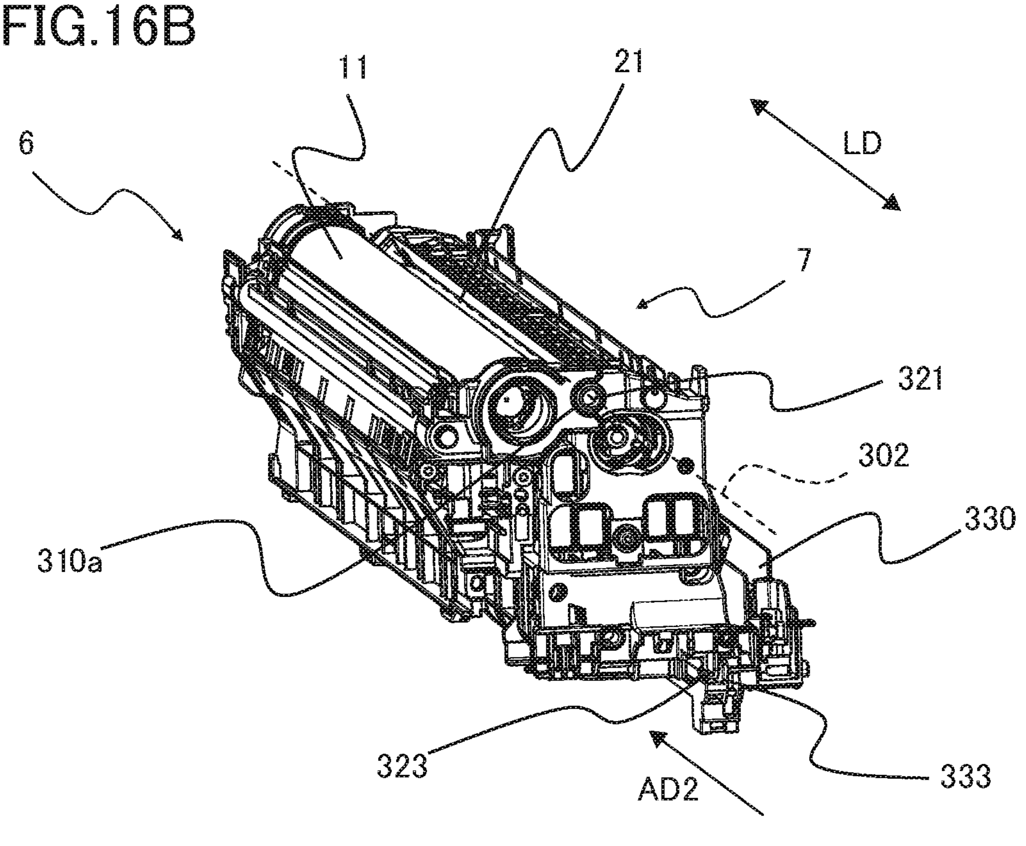
FIG. 16B is another perspective view illustrating the drum cartridge and the developing cartridge in the state where they are attached to the printer body.

Next, a configuration for positioning the developing cartridges 7 will be described using FIGS. 15A to 16B. FIG. 15A is a perspective view illustrating the drum cartridge 6, and FIG. 15B is a perspective view illustrating the developing cartridge 7. FIG. 15C is a perspective view illustrating the guide rail 330. FIG. 16A is a perspective view of the drum cartridge 6 and the developing cartridge 7 in a state where they are attached to the printer body 100 when seen from the front side. FIG. 16B is a perspective view of the drum cartridge 6 and the developing cartridge 7 in a state where they are attached to the printer body 100 when seen from the back side.

Note that a first end side of the drum cartridge 6 and the developing cartridge 7 in the longitudinal direction LD may be referred to as a closer side and a second end side may be referred to a furthest side or a back side below. Additionally, element dispositions, shapes, and the like of the drum cartridge 6 and the developing cartridge 7 will be described on the basis of the state where the drum cartridge 6 and the developing cartridge 7 are attached to the printer body 100.

As illustrated in FIG. 15A, the drum cartridge 6 includes developing cartridge positioning members 309 and 310 at both end portions in the longitudinal direction LD. The developing cartridge positioning members 309 and 310 include U-shaped developing cartridge positioning portions 309*a* and 310*a* opening on the side of the developing cartridge 7.

As illustrated in FIG. 15B, the developing cartridge 7 includes positioning bosses 320 and 321 and rotation stopper portions 322 and 323 at both end portions in the longitudinal direction LD. The positioning bosses 320 and 321 are disposed upward of the rotation stopper portions 322 and 323. As illustrated in FIG. 15C, the guide rail 330 includes a groove portion 331 that guides the developing cartridge 7 in the attachment direction AD2. Rotation stopper surfaces 332 and 333 are provided at both end portions of the groove portion 331 in the longitudinal direction LD. The rotation stopper surfaces 332 and 333 can come into contact with the rotation stopper portions 322 and 323 that serve as first positioned portions of the developing cartridge 7.

Next, an attachment method and a positioning method of the developing cartridge 7 will be described. Note that the drum cartridge 6 is attached to the printer body 100 in the attachment direction AD2 along the guide rail 330. Then, the drum cartridge 6 is positioned with respect to the printer body 100 by a pressing mechanism, which is not illustrated, and the positioning portion in a state where the drum cartridge 6 is attached to the printer body 100.

In a case where the developing cartridge 7 is attached to (inserted into) the printer body 100, the rotation stopper portions 322 and 323 of the developing cartridge 7 are engaged with the groove portion 331 of the guide rail 330 as illustrated in FIGS. 15B, 15C, 16A, and 16B. Then, the developing cartridge 7 is attached to the printer body 100 in the attachment direction AD2 while the rotation stopper portions 322 and 323 are guided to the groove portion 331 in the attachment direction AD2.

Then, the positioning bosses 320 and 321 that serve as second positioned portions of the developing cartridge 7 are engaged with the developing cartridge positioning portions 309*a* and 310*a* that serve as second positioning portions of the drum cartridge 6. The positioning bosses 320 and 321 are engaged with the developing cartridge positioning portions 309*a* and 310*a* in the orthogonal direction that perpendicularly intersects the attachment direction AD2 that is parallel to the axis direction of the photosensitive drum 11. In this manner, the developing cartridge 7 is positioned in the orthogonal direction with respect to the drum cartridge 6. In other words, the developing cartridge 7 is positioned in the orthogonal direction that perpendicularly intersects the attachment direction AD2 with respect to the printer body 100 via the drum cartridge 6, by the positioning bosses 320 and 321 coming into contact with the developing cartridge positioning portions 309*a* and 310*a*.

Further, the developing cartridge 7 is pressed by a pressing member, which is not illustrated, by the rotation stopper portions 322 and 333 of the developing cartridge 7 coming into contact with the rotation stopper surfaces 332 and 333 provided at the guide rail 330. In this manner, rotation of the developing cartridge 7 around the positioning bosses 320 and 321 is restricted. In this manner, the developing cartridge 7 is positioned with respect to the printer body 100 and the drum cartridge 6 in a state where it is attached to the printer body 100. In other words, the position of the developing cartridge 7 on a virtual plane that perpendicularly intersects the attachment direction AD2 with respect to the printer body 100 is determined.

As described above, the developing cartridge 7 is positioned in a direction that perpendicularly intersects the attachment direction AD2 (longitudinal direction LD) by the developing cartridge positioning portions 309*a* and 310*a* provided in the drum cartridge 6. Additionally, rotation of the developing cartridge 7 around the positioning bosses 320 and 321 is restricted by the rotation stopper surfaces 332 and 333 of the guide rail 330 provided in the printer body 1W. In other words, rotation of the developing cartridge 7 around the rotation shaft 302 passing through the centers of the positioning bosses 320 and 321 and extending in the longitudinal direction LD is restricted by the rotation stopper surfaces 332 and 333 that serve as first positioning portions.

In this manner, it is possible to disperse a load from the developing cartridge 7 to the drum cartridge 6 and the printer body 100 by assigning the configuration for positioning the developing cartridge 7 to the drum cartridge 6 and the printer body 100. In other words, a part of the weight of the developing cartridge 7 can be supported by the guide rail 330 of the printer body 100, and it becomes unnecessary to firmly configure the drum cartridge 6. Therefore, it is possible to reduce the size of the drum cartridge 6.

Additionally, the developing cartridge 7 is positioned with respect to the drum cartridge 6, and it is thus possible to improve accuracy of positioning of the developing cartridge 7 and the drum cartridge 6. Moreover, since the developing cartridge 7 is positioned with respect to the printer body 100 as well, it is possible to accurately determine the relative positional relationship with the drum cartridge 6 positioned with respect to the printer body 100. Therefore, it is possible to improve accuracy of positioning of the developing roller 21 of the developing cartridge 7 and the photosensitive drum 11 of the drum cartridge 6.

As described above, it is possible to improve accuracy of positioning of the developing cartridge 7 with respect to the drum cartridge 6 without leading to an increase in size of the drum cartridge 6.

Fourth Embodiment

Next, a fourth embodiment of the present technology will be described, and the fourth embodiment is obtained by changing the positioning configuration of the developing cartridge 7 in the third embodiment. Therefore, illustration of configurations similar to those in the third embodiment will be omitted, or such configurations will be described by applying the same reference signs in the drawings.

Configuration for Positioning Developing Cartridges

Figure 17A:
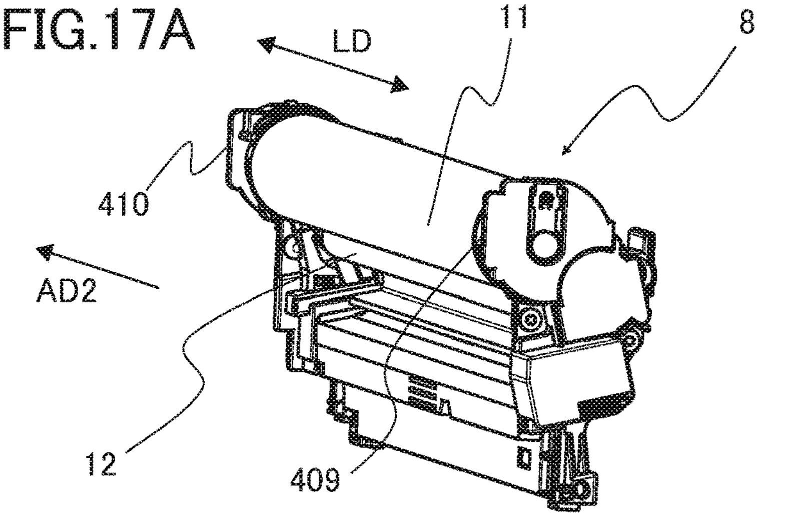
FIG. 17A is a perspective view illustrating a drum cartridge according to a fourth embodiment.
Figure 17B:
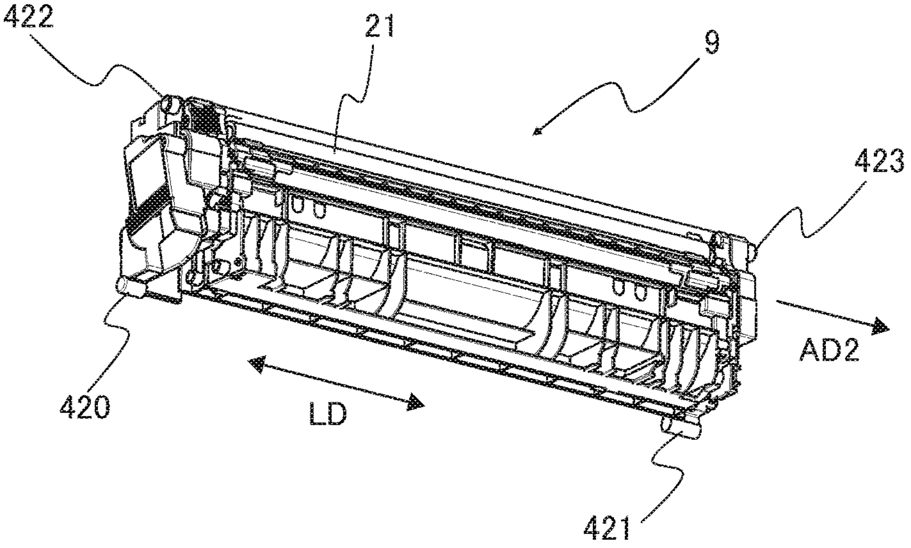
FIG. 17B is a perspective view illustrating a developing cartridge.
Figure 17C:
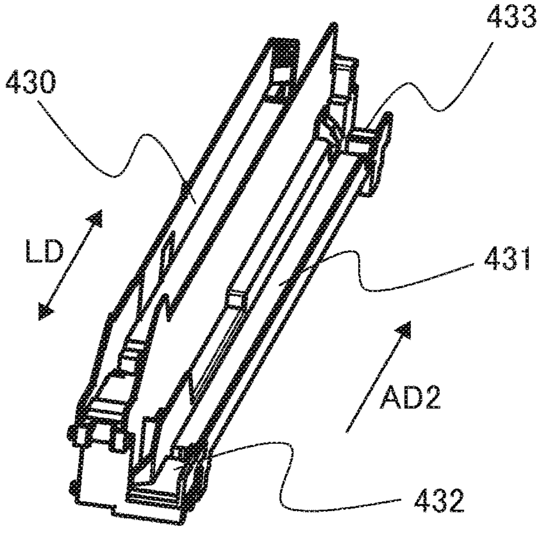
FIG. 17C is a perspective view illustrating a guide rail.
Figure 18A:
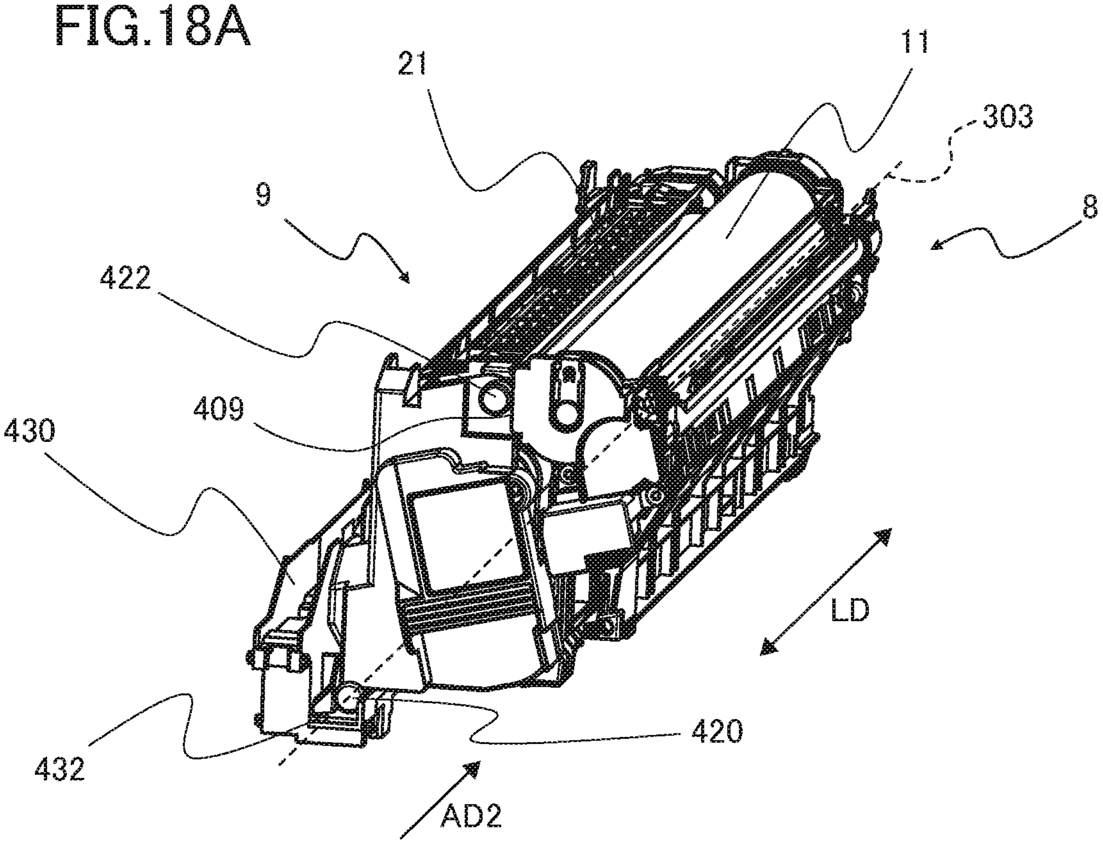
FIG. 18A is a perspective view illustrating the drum cartridge and the developing cartridge in a state where they are attached to a printer body.
Figure 18B:
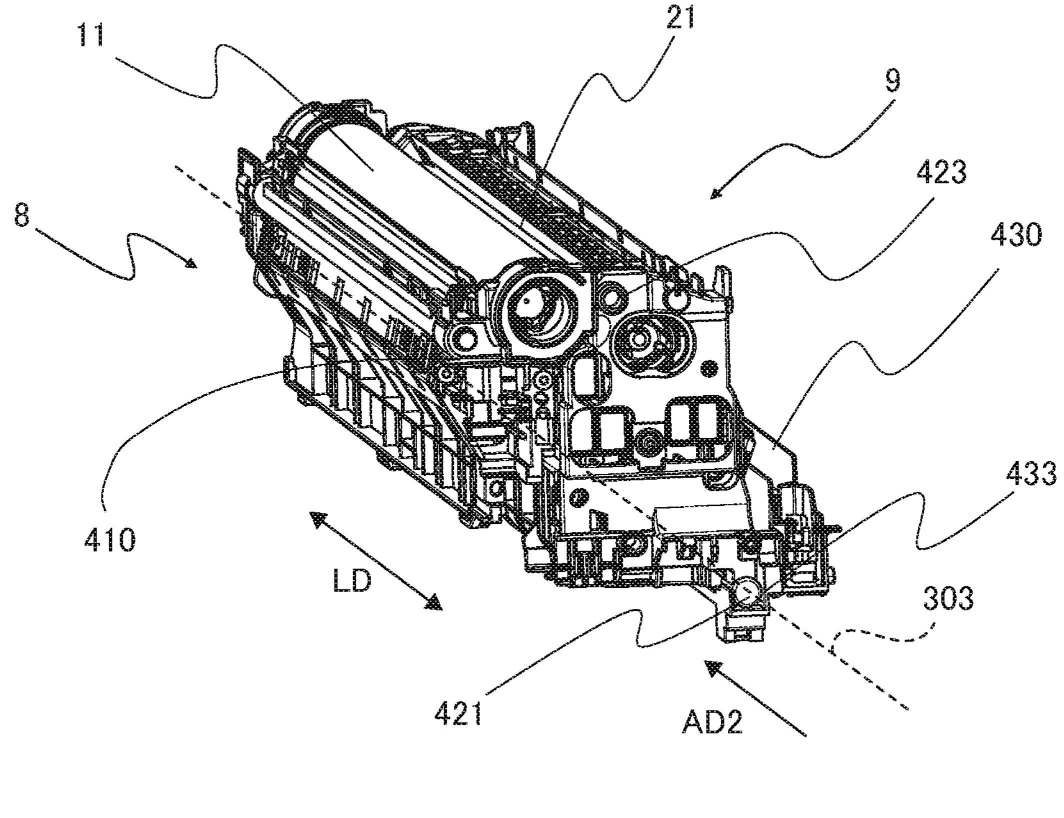
FIG. 18B is another perspective view illustrating the drum cartridge and the developing cartridge in the state where they are attached to the printer body.

Next, a configuration for positioning a developing cartridge 9 according to the fourth embodiment will be described using FIGS. 17A to 18B. FIG. 17A is a perspective view illustrating a drum cartridge 8, and FIG. 17B is a perspective view illustrating the developing cartridge 9. FIG. 17C is a perspective view illustrating a guide rail 430. FIG. 18A is a perspective view of the drum cartridge 8 and the developing cartridge 9 in a state where they are attached to the printer body 100 when seen from the front side. FIG. 18B is a perspective view of the drum cartridge 8 and the developing cartridge 9 in a state where they are attached to the printer body 100 when seen from the back side.

As illustrated in FIG. 17A, the drum cartridge 8 that serves as a first cartridge includes rotation stopper surfaces 409 and 410 at both end portions in the longitudinal direction LD. The rotation stopper surfaces 409 and 410 extend in a direction that perpendicularly intersects the axis direction (longitudinal direction LD) of the photosensitive drum 11.

As illustrated in FIG. 17B, the developing cartridge 9 that serves as a second cartridge includes positioning bosses 420 and 421 and rotation stopper portions 422 and 423 at both end portions in the longitudinal direction LD. The positioning bosses 420 and 421 that serve as first positioned portions are disposed at a lower end portion of the developing cartridge 9 and are disposed downward of the rotation stopper portions 422 and 423. As illustrated in FIG. 17C, the guide rail 430 includes a groove portion 431 that guides the developing cartridge 9 in the attachment direction AD2. Developing cartridge positioning portions 432 and 433 are provided at both end portions of the groove portion 431 in the longitudinal direction LD. The developing cartridge positioning portions 432 and 433 can be engaged with the positioning bosses 420 and 421 of the developing cartridge 9.

Next, an attachment method and a positioning method of the developing cartridge 9 will be described. Note that the drum cartridge 8 is positioned with respect to the printer body 100 by a method similar to that in the third embodiment.

In a case where the developing cartridge 9 is attached to (inserted into) the printer body 100, the positioning bosses 420 and 421 of the developing cartridge 9 are engaged with the groove portion 431 of the guide rail 330 as illustrated in FIGS. 17B, 17C, 18A, and 18B. Then, the developing cartridge 9 is attached to the printer body 100 in the attachment direction AD2 while the positioning bosses 420 and 421 are guided to the groove portion 431 in the attachment direction AD2.

Then, the positioning bosses 420 and 421 of the developing cartridge 9 are engaged with the developing cartridge positioning portions 432 and 433 of the guide rail 330. Note that the developing cartridge positioning portions 432 and 433 may be formed to have a narrow width than the other parts of the groove portion 431 or may be recessed downward.

The developing cartridge positioning portions 432 and 433 that serve as first positioning portions are engaged with the developing cartridge positioning portions 432 and 433 in the orthogonal direction that perpendicularly intersects the attachment direction AD2 that is parallel to the axis direction of the photosensitive drum 11. In this manner, the developing cartridge 9 is positioned in the orthogonal direction with respect to the printer body 100 including the guide rail 430.

Further, the developing cartridge 9 is pressurized by a pressurizing member, which is not illustrated, such that the rotation stopper portions 422 and 423 that serve as second positioned portions of the developing cartridge 9 comes into contact with the rotation stopper surfaces 409 and 410 provided in the drum cartridge 8. In this manner, rotation of the developing cartridge 9 around the positioning bosses 420 and 421 is restricted. In this manner, the developing cartridge 9 is positioned with respect to the printer body 100 and the drum cartridge 8 in a state where it is attached to the printer body 100. In other words, the position of the developing cartridge 9 on a virtual plane that perpendicularly intersects the attachment direction AD2 with respect to the printer body 100 and the drum cartridge 8 is determined.

As described above, the developing cartridge 9 is positioned in the direction that perpendicularly intersects the attachment direction AD2 (longitudinal direction LD) by the developing cartridge positioning portions 432 and 433 of the guide rail 430 provided in the printer body 100. Also, rotation of the developing cartridge 9 around the positioning bosses 420 and 421 is restricted by the rotation stopper surfaces 409 and 410 provided in the drum cartridge 8. In other words, rotation of the developing cartridge 9 around the rotation shaft 303 passing through the centers of the positioning bosses 420 and 421 and extending in the longitudinal direction LD is restricted by the rotation stopper surfaces 409 and 410 that serve as second positioning portions. In this manner, effects that are similar to those in the third embodiment can be achieved.

OTHER EMBODIMENTS

Note that the example in which the process cartridge and the toner cartridge are individually attached to and detached from the printer body has been described in the first and second embodiments. However, the process cartridge and the toner cartridge may be integrally attached to and detached from the printer body in a state where the toner cartridge is held by the process cartridge.

For example, the rotation stopper portions 122*a* and 123*a* may come into contact with the contact surfaces 130*d* and 131*d*, and the toner cartridge 3 may be positioned, after the process cartridge 2 and the toner cartridge 3 are integrally inserted into the printer body 1 in the first embodiment. Additionally, the positioning portions 222*a* and 223*a* may come into contact with the groove portions 240 and 241, and the toner cartridge 5 may be positioned, after the process cartridge 4 and the toner cartridge 5 are integrally inserted into the printer body 1 in the second embodiment.

Also, although the configuration in which the toner cartridge is positioned by the printer body and the process cartridge has been described as an example in the first and second embodiments, the present technology is not limited thereto. For example, a configuration in which the process cartridge is positioned by the printer body and the toner cartridge may also be adopted. In other words, the toner cartridge may be defined as a first cartridge, and the process cartridge may be defined as a second cartridge. At this time, a positioning portion that positions the second cartridge in the attachment direction AD that perpendicularly intersects the longitudinal direction LD may be provided at any one of the printer body 1 and the first cartridge. Also, a rotation restricting portion that restricts rotation of the second cartridge around the rotation shaft extending in the longitudinal direction LD may be provided at the other one of the printer body 1 and the first cartridge.

Also, a drum cartridge including the photosensitive drum 11, the charging roller 12, and the cleaning blade 13 may be defined as the first cartridge, and a developing cartridge including the developing roller 21 may be defined as the second cartridge, for example. Also, a positioning portion that positions the second cartridge in the attachment direction AD that perpendicularly intersects the longitudinal direction LD may be provided at any one of the printer body 1 and the first cartridge. Also, a rotation restricting portion that restricts rotation of the second cartridge around the rotation shaft extending in the longitudinal direction LD may be provided at the other one of the printer body 1 and the first cartridge. Additionally, a positioning portion that positions the first cartridge in the attachment direction AD that perpendicularly intersects the longitudinal direction LD may be provided at any one of the printer body 1 and the second cartridge. Moreover, a rotation restricting portion that restricts rotation of the first cartridge around the rotation shaft extending in the longitudinal direction LD may be provided at the other one of the printer body 1 and the second cartridge.

Also, although the configuration in which the developing cartridge is positioned by the printer body and the drum cartridge has been described as an example in the third and fourth embodiments, the present technology is not limited thereto. For example, a configuration in which the drum cartridge is positioned by the printer body and the developing cartridge may be adopted. In other words, the developing cartridge may be defined as a first cartridge, and the drum cartridge may be defined as a second cartridge. At this time, a positioning portion that positions the second cartridge in the orthogonal direction that perpendicularly intersects the longitudinal direction LD may be provided at any one of the printer body 100 and the first cartridge. Moreover, a rotation restricting portion that restricts rotation of the second cartridge around the rotation shaft extending in the longitudinal direction LD may be provided at the other one of the printer body 100 and the first cartridge.

In addition, the toner cartridge that serves as the second cartridge may be positioned by the process cartridge that serves as the first cartridge and the printer body as described above in the first and second embodiments, for example. Additionally, a positioning portion that positions the second cartridge in the orthogonal direction that perpendicularly intersects the longitudinal direction LD may be provided at any one of the first cartridge and the second cartridge. Moreover, a rotation restricting portion that restricts rotation of the second cartridge around the rotation shaft extending in the longitudinal direction LD may be provided at the other one of the first cartridge and the second cartridge.

Also, the first to fourth embodiments may be arbitrarily combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102265, filed Jun. 24, 2022, which is hereby incorporated by reference herein in its entirety.

What is claimed is:

1. An image forming apparatus comprising:
- an apparatus body including a first positioning portion;
- a first cartridge detachably attached to the apparatus body, the first cartridge including:
  - a developer bearing member configured to bear a developer, and
  - a second positioning portion; and
- a second cartridge detachably attached to the apparatus body independent of the first cartridge and in an attachment direction, the second cartridge including:
  - a storage portion configured to accommodate the developer;
  - a first positioned portion; and
  - a second positioned portion,
- wherein the second cartridge is configured to be attached to and detached from the apparatus body in a state where the first cartridge is attached to the apparatus body, and a position of the second cartridge in the attachment direction with respect to the apparatus body and the first cartridge is determined by the first positioned portion and the second positioned portion coming into contact with the first positioning portion of the apparatus body and the second positioning portion of the first cartridge, respectively.

2. The image forming apparatus according to claim 1, wherein the position of the second cartridge in the attachment direction with respect to the first cartridge is determined by the second positioned portion of the second cartridge coming into contact with the second positioning portion of the first cartridge, and a rotation of the second cartridge around the second positioned portion with respect to the apparatus body is restricted by the first positioned portion of the second cartridge coming into contact with the first positioning portion of the apparatus body.

3. The image forming apparatus according to claim 2, wherein the second positioning portion of the first cartridge includes an abutment surface configured to position the second cartridge in the attachment direction by the second positioned portion abutting the abutment surface.

4. The image forming apparatus according to claim 2, wherein the developer bearing member is rotatable about a rotational axis, and
- wherein a rotation of the second cartridge around an axis is restricted by the first positioned portion of the second cartridge coming into contact with the first positioning portion of the apparatus body, the axis passing through the second positioned portion and being parallel to the rotational axis.

5. The image forming apparatus according to claim 1, wherein the position of the second cartridge in the attachment direction with respect to the apparatus body is determined by the first positioned portion of the second cartridge coming into contact with the first positioning portion of the apparatus body, and a rotation of the second cartridge around the second positioned portion with respect to the first cartridge is restricted by the second positioned portion of the second cartridge coming into contact with the second positioning portion of the first cartridge.

6. The image forming apparatus according to claim 5, wherein the first positioning portion of the apparatus body includes:
- a first surface that extends downstream in a gravity direction as the first surface extends upstream in the attachment direction; and
- a second surface that is disposed upstream of the first surface in the attachment direction and extends upstream in the gravity direction as the second surface extends upstream in the attachment direction.

7. The image forming apparatus according to claim 5, wherein the developer bearing member is rotatable about a rotational axis, and
- wherein a rotation of the second cartridge around an axis is restricted by the second positioned portion of the second cartridge coming into contact with the second positioning portion of the apparatus body, the axis passing through the second positioned portion and being parallel to the rotational axis.

8. The image forming apparatus according to claim 1, wherein the first positioned portion is disposed upstream of the second positioned portion in the attachment direction.

9. The image forming apparatus according to claim 1, wherein the first positioned portion is disposed such that at least a part of the first positioned portion overlaps the second positioned portion when viewed in the attachment direction.

10. The image forming apparatus according to claim 1, wherein the developer bearing member is rotatable about a rotational axis, and the attachment direction is orthogonal to the rotational axis.

11. The image forming apparatus according to claim 10, wherein the second positioned portion is formed into a columnar shape,
- wherein the second cartridge includes:
- a drive input portion that receives a drive force from the apparatus body and rotates; and
- a pump unit,
- wherein the pump unit includes:
- a cam member that is rotated by the drive force which the drive input portion receives from the apparatus body; and
- a pump that communicates with the storage portion, and the pumps expands or contracts with response to a rotation of the cam member to change an internal volume of the storage portion, and
- wherein, when viewed in a direction of the rotational axis, in a case where-a first area and a second area are divided by a straight line, a rotation center of the drive input portion is disposed in the first area, and a rotation center of the cam member is disposed in the second area, with the straight line passing through a contact part and a center of the second positioned portion, the contact part being a part where the first positioned portion of the second cartridge and the first positioning portion of the apparatus body come into contact with each other.

12. The image forming apparatus according to claim 11, wherein the drive input portion is a first drive input portion, wherein the second cartridge includes:

a second drive input portion that receives a drive force from the apparatus body and rotates; and a stirring unit that is rotated by the drive force which the second drive input portion receives from the apparatus body, and the stirring unit stirs a developer in the storage portion, and wherein a rotation center of the second drive input portion is disposed in the first area.

13. The image forming apparatus according to claim 12, wherein a rotation center of the stirring unit is disposed in the first area.

14. The image forming apparatus according to claim 12, wherein the first drive input portion and the second drive input portion receive drive force from the apparatus body independently from each other.

15. The image forming apparatus according to claim 1, wherein the first cartridge is a process cartridge and includes:

a first unit including the developer bearing member; and a second unit including a developing member which develops a toner image on a surface of the developer bearing member by using a developer, and wherein the second cartridge is a toner cartridge configured to supply the developer from the storage portion to the first cartridge.

16. The image forming apparatus according to claim 1, wherein a position of the second cartridge on a virtual plane orthogonal to the attachment direction with respect to the apparatus body and the first cartridge is determined by the first positioned portion and the second positioned portion coming into contact with the first positioning portion and the second positioning portion, respectively.

* * * * *